(12) United States Patent
Okano et al.

(10) Patent No.: US 10,249,886 B2
(45) Date of Patent: Apr. 2, 2019

(54) FUEL-CELL GAS DIFFUSION LAYER, AND METHOD OF PRODUCING SAME

(71) Applicant: Toray Industries, Inc., Tokyo (JP)

(72) Inventors: Yasutaka Okano, Otsu (JP); Koichi Antoku, Otsu (JP); Eisuke Wadahara, Tokyo (JP)

(73) Assignee: Toray Industries, Inc. (JP)

( * ) Notice: Subject to any disclaimer, the term of this patent is extended or adjusted under 35 U.S.C. 154(b) by 182 days.

(21) Appl. No.: 14/764,213

(22) PCT Filed: Feb. 7, 2014

(86) PCT No.: PCT/JP2014/052846
§ 371 (c)(1),
(2) Date: Jul. 29, 2015

(87) PCT Pub. No.: WO2014/126002
PCT Pub. Date: Aug. 21, 2014

(65) Prior Publication Data
US 2015/0372332 A1 Dec. 24, 2015

(30) Foreign Application Priority Data
Feb. 13, 2013 (JP) .................................. 2013-025133

(51) Int. Cl.
*H01M 4/36* (2006.01)
*H01M 8/0239* (2016.01)
(Continued)

(52) U.S. Cl.
CPC ....... *H01M 8/0239* (2013.01); *H01M 4/8807* (2013.01); *H01M 8/0234* (2013.01);
(Continued)

(58) Field of Classification Search
CPC . H01M 4/8807; H01M 4/8626; H01M 8/0239
See application file for complete search history.

(56) References Cited

U.S. PATENT DOCUMENTS

| | | | |
|---|---|---|---|
| 2002/0197525 A1* | 12/2002 | Tomita | H01M 4/8605 429/480 |
| 2003/0194557 A1* | 10/2003 | Wilde | D21H 13/50 428/408 |

(Continued)

FOREIGN PATENT DOCUMENTS

| | | |
|---|---|---|
| JP | 61-236664 A | 10/1986 |
| JP | 2003-288906 A | 10/2003 |

(Continued)

*Primary Examiner* — Jeremiah R Smith
(74) *Attorney, Agent, or Firm* — DLA Piper LLP (US)

(57) ABSTRACT

A fuel cell gas diffusion layer includes:
a porous carbon fiber base substrate containing discontinuous carbon fibers bonded to each other with carbide, and
a porous layer containing at least carbonaceous particles, the porous carbon fiber base substrate having a porous layer (A) with a mean thickness t1 of 10 to 55 μm deposited on one surface A thereof, the porous carbon fiber base substrate being impregnated with porous layer (J) at least part of which is exposed at an opposite surface B, the porous carbon fiber base substrate having internal pores with a cross-sectional area accounting for 5% to 40% of the total cross section in a through-plane direction, at least porous layer (A) and porous layer (J) both having a void percentage of 50% to 85%, the porous carbon fiber base substrate having a thickness of 60 to 300 μm, and the porous carbon fiber base substrate having a bulk density of 0.20 to 0.45 g/cm³.

13 Claims, 3 Drawing Sheets

(51) Int. Cl.
*H01M 4/88* (2006.01)
*H01M 8/0234* (2016.01)
*H01M 8/0241* (2016.01)
*H01M 8/0245* (2016.01)
*H01M 8/1018* (2016.01)

(52) U.S. Cl.
CPC ....... *H01M 8/0241* (2013.01); *H01M 8/0245* (2013.01); *H01M 2008/1095* (2013.01)

(56) References Cited

U.S. PATENT DOCUMENTS

| | | | | |
|---|---|---|---|---|
| 2003/0198860 | A1* | 10/2003 | Yasumoto | H01M 4/8605 |
| | | | | 429/492 |
| 2004/0058229 | A1 | 3/2004 | Beattie et al. | |
| 2005/0197246 | A1* | 9/2005 | Yoshida | H01M 4/8605 |
| | | | | 502/101 |
| 2005/0221152 | A1* | 10/2005 | Turpin | H01M 4/8605 |
| | | | | 429/514 |
| 2009/0011308 | A1* | 1/2009 | Lee | H01M 4/8807 |
| | | | | 429/479 |
| 2010/0098991 | A1* | 4/2010 | Suzuki | H01M 4/8605 |
| | | | | 429/481 |
| 2011/0053038 | A1* | 3/2011 | Schoeneweiss | C07D 487/22 |
| | | | | 429/483 |
| 2014/0205919 | A1* | 7/2014 | Wilde | H01M 4/8807 |
| | | | | 429/406 |

FOREIGN PATENT DOCUMENTS

| | | |
|---|---|---|
| JP | 2004-31326 A | 1/2004 |
| JP | 2004-518242 A | 6/2004 |
| JP | 2005-149745 A | 6/2005 |
| JP | 2006-004787 A | 1/2006 |
| JP | 2006-265093 A | 10/2006 |
| JP | 2008-127661 A | 6/2008 |
| JP | 2010-192379 A | 9/2010 |

* cited by examiner

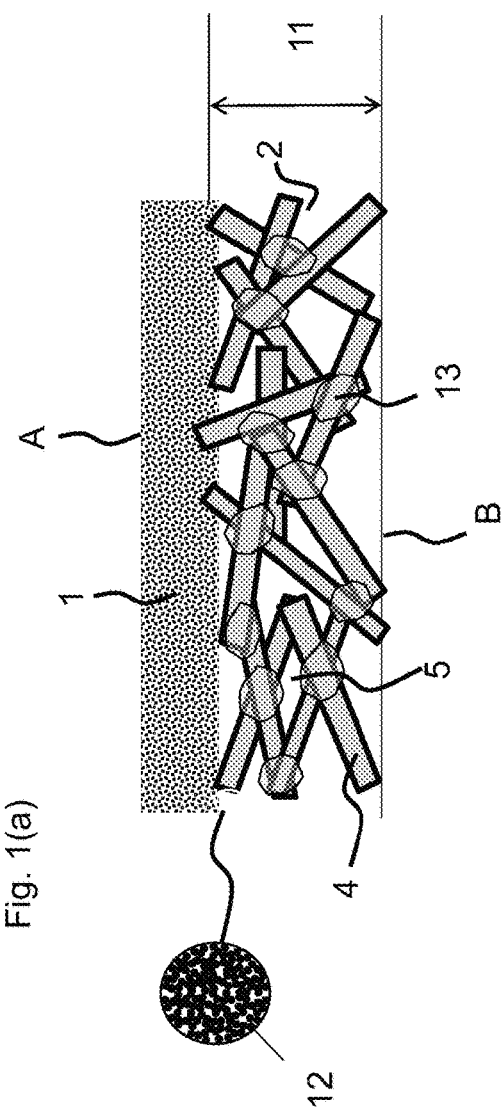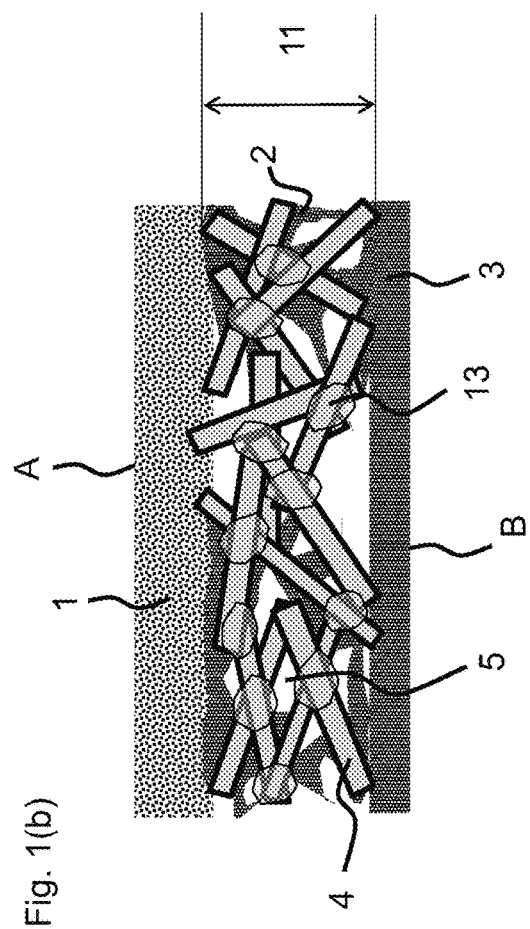

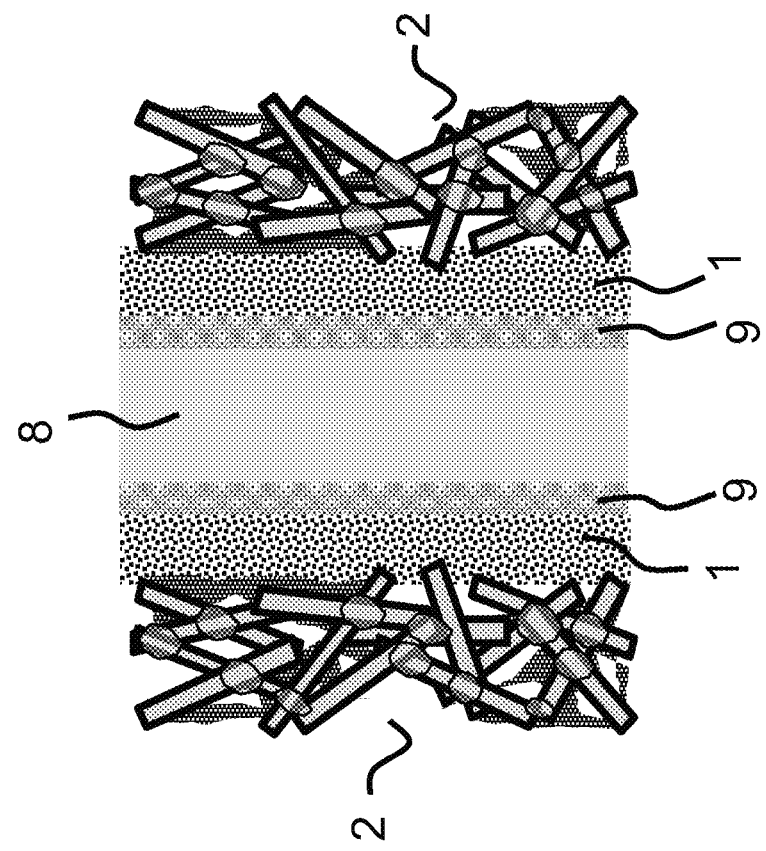

FUEL-CELL GAS DIFFUSION LAYER, AND METHOD OF PRODUCING SAME

TECHNICAL FIELD

This disclosure relates to a gas diffusion layer used in fuel cells, particularly in polymer electrolyte fuel cells. More specifically, it relates to a gas diffusion layer having a high gas diffusivity and a high water removal performance in the through-plane direction to ensure high fuel cell performance, has a decreased gas permeability in the in-plane direction so that short cuts of gas are prevented from being formed between the channels in the bipolar plates to allow the gas (hydrogen and oxygen) coming from the bipolar plates to be supplied uniformly into the catalyst layers, and also has good mechanical properties, high electrical conductivity, and high thermal conductivity.

BACKGROUND

A polymer electrolyte fuel cell in which fuel gas containing hydrogen is supplied to an anode while oxidizing gas containing oxygen is supplied to a cathode to cause electromotive force to be produced from an electrochemical reaction taking place at the two poles commonly consists mainly of a bipolar plate, gas diffusion layer, catalyst layer, electrolyte membrane, catalyst layer, gas diffusion layer, and bipolar plate stacked in this order. The gas diffusion layers are required to have a high gas diffusivity so that gas supplied from the bipolar plates are allowed to diffuse into the catalyst, high water removal performance so that water resulting from the electrochemical reaction is discharged into the bipolar plates, and high electrical conductivity so that the generated electric currents are taken out efficiently. Gas diffusion layers formed of carbon fiber and the like (hereinafter referred to simply as gas diffusion layer) have been used widely.

In a fuel cell, gas diffusivity and water removal performance should be high in the through-plane direction of the gas diffusion layers to ensure high fuel cell performance in a wide range of environment conditions. To meet this requirement, Japanese Unexamined Patent Publication (Kokai) No. 2010-192379 proposes a method of reducing the bulk density of the porous carbon fiber base substrate and Japanese Unexamined Patent Publication (Kokai) No. 2005-149745 proposes a method of reducing the thickness of the porous carbon fiber base substrate. To allow the gas (hydrogen and oxygen) coming from the bipolar plates to be supplied uniformly into the catalyst layers, on the other hand, gas permeability in the in-plane direction (in-plane gas permeability) of the gas diffusion layers should be reduced to depress short cuts of gas between the channels in the bipolar plates. To meet this requirement, Japanese Unexamined Patent Publication (Kokai) No. 2003-288906 proposes a method of increasing the bulk density of the porous carbon fiber base substrate and Japanese Unexamined Patent Publication (Kokai) No. 2008-127661 proposes a method of impregnating the porous carbon fiber base substrate with a porous layer. However, a trade-off relationship exists between increasing gas diffusivity and water removal performance in the through-plane direction and decreasing gas permeability in the in-plane direction. It has thus been difficult to realize both objectives in a higher level balance. Japanese Unexamined Patent Publication (Kokai) No. 2006-004787, furthermore, proposes a method of intentionally forming concave-shape portions in the porous layer surface to increase gas diffusivity in the through-plane direction, although leading to problems with the durability of the porous layer taking place when used repeatedly for power generation.

It could therefore be helpful to provide a gas diffusion layer that develops high fuel cell performance by increasing gas diffusivity and water removal performance in the through-plane direction and also depresses short cuts of gas between the channels in the bipolar plates by decreasing gas permeability in the in-plane direction and further aims to provide a gas diffusion layer that contains a porous layer with a highly smooth surface.

SUMMARY

We thus provide a fuel cell gas diffusion layer comprising a porous carbon fiber base substrate containing discontinuous carbon fibers bonded to each other with carbide and a porous layer containing at least carbonaceous particles, the porous carbon fiber base substrate having a layer (A) with a thickness t1 of 10 to 55 µm deposited on one surface, namely surface A, thereof, the porous carbon fiber base substrate being impregnated with a porous material (J) at least part of which is exposed at the opposite surface, namely surface B, the porous carbon fiber base substrate holding internal pores having a cross-sectional area accounting for 5% to 40% of the total cross section in the through-plane direction, at least layer (A) and porous material (J) both having a void percentage of 50% to 85%, the porous carbon fiber base substrate having a thickness of 60 to 300 jam, and the porous carbon fiber base substrate having a bulk density of 0.20 to 0.45 $g/cm^3$.

Preferably, layer (A) mentioned above and porous material (J) mentioned above have different constitutions.

Preferably, layer (A) mentioned above and porous material (J) mentioned above have the same constitution.

We also provide a production method for the fuel cell gas diffusion layer mentioned above comprising an impregnation process (I) for impregnating a porous carbon fiber base substrate containing discontinuous carbon fibers bonded to each other with carbide with dispersion liquid (1) containing at least carbonaceous particles and a dispersion medium, a deposit process (II) for depositing dispersion liquid (2) containing at least carbonaceous particles and a dispersion medium on one surface, namely surface A, of the porous carbon fiber base substrate resulting from the impregnation process (I), and a process for heating and sintering the porous carbon fiber base substrate resulting from the deposit process (II).

To produce a fuel cell gas diffusion layer where layer (A) and porous material (J) have the same constitution, an adoptable production method for the fuel cell gas diffusion layer comprises a deposit-impregnation process (II-3) for depositing dispersion liquid (2) containing at least carbonaceous particles and a dispersion medium on one surface, namely surface A, of a porous carbon fiber base substrate containing discontinuous carbon fibers bonded to each other with carbide, and infiltrating dispersion liquid (2) into the porous carbon fiber base substrate and a process for heating and sintering the porous carbon fiber base substrate resulting from the deposit-impregnation process (II-3).

We thus provide a gas diffusion layer that serves to develop high fuel cell performance by increasing gas diffusivity and water removal performance in the through-plane direction and also serves to depress short cuts of gas between the channels in the bipolar plates by decreasing gas permeability in the in-plane direction and that contains a porous layer with a highly smooth surface.

BRIEF DESCRIPTION OF THE DRAWINGS

FIGS. 1(a) and 1(b) show schematic cross-sectional diagrams of a fuel cell gas diffusion layer, FIG. 1(a) illustrating an example where the porous carbon fiber base substrate being impregnated with a layer (B) at least part of which is exposed at the other surface, or surface B, and FIG. 1(b) illustrating layer (B) exposed over the entirety of the other surface, or surface B, of the porous carbon fiber base substrate.

FIG. 3 is a schematic cross-sectional diagram of a membrane electrode assembly (MEA) containing a gas diffusion layer.

Figure 2:
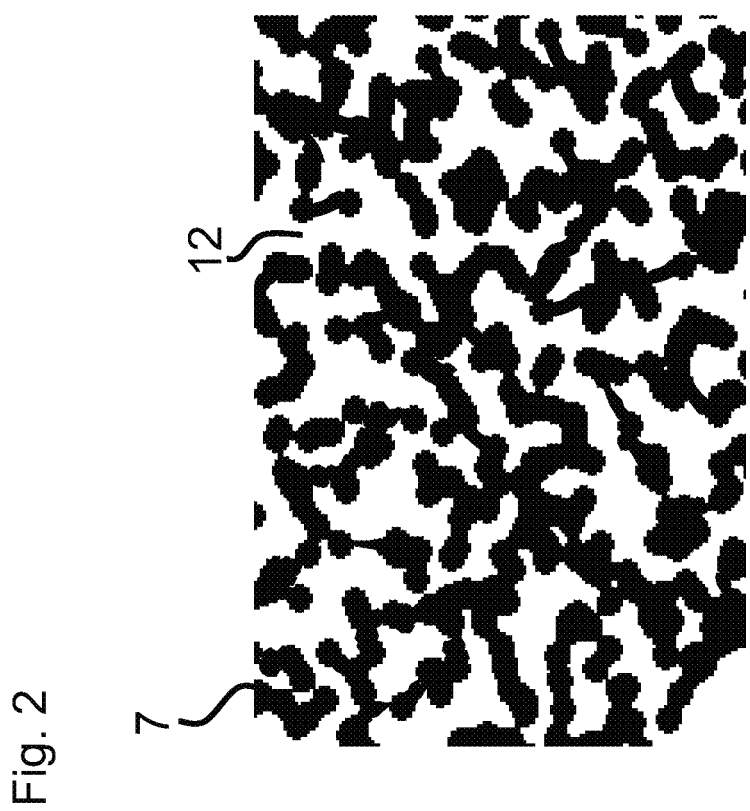
FIG. 2 is a schematic diagram of a cross section of a porous layer, image-processed for binarization to identify voids.

EXPLANATION OF NUMERALS 1. layer (A)
2. porous material (J)
3. layer (B)
4. carbon fiber
5. pore
7. carbonaceous particles (or hydrophobic polymer)
8. electrolyte membrane
9. catalyst layer
11. porous carbon fiber base substrate
12. voids
13. carbonized material

DETAILED DESCRIPTION

The fuel cell gas diffusion layer is described below with reference to diagrams. It should be understood, however, that our layers and methods are not construed as being limited by the constructions given in the diagrams.

FIGS. 1(a) and 1(b) are schematic cross-sectional diagrams of a fuel cell gas diffusion layer. It is a fuel cell gas diffusion layer (hereinafter occasionally abbreviated as GDL) including a porous carbon fiber base substrate 11 (hereinafter occasionally abbreviated as CP) containing discontinuous carbon fibers 4 bonded to each other with carbide and a porous layer (hereinafter occasionally abbreviated as MPL) containing at least carbonaceous particles, the porous carbon fiber base substrate 11 containing layer (A) that is porous and deposited to an average thickness of t1 (μm) on one surface A thereof, the porous carbon fiber base substrate 11 being impregnated with porous material (J), and the porous carbon fiber base substrate 11 holding pores inside. Each of the components is described below.

The porous carbon fiber base substrate 11, which is an integral component, is described first in detail below.

The porous carbon fiber base substrate 11 is required to have a high gas diffusivity so that gas supplied from the bipolar plates are allowed to diffuse into the catalyst, high water removal performance so that the water resulting from the electrochemical reaction is discharged into the bipolar plates, and high electrical conductivity so that the generated electric currents are taken out efficiently. To this end, it is preferable to use a porous carbon fiber base substrate that has electrical conductivity and a mean pore size of 10 to 100 nm. More specifically, it is preferable, for example, to use carbon fiber woven fabric or carbon fiber non-woven fabric such as a carbon fiber papermaking substrate. In particular, it is preferable to use a substrate formed of a carbon fiber papermaking substrate bonded with carbide, that is, so-called carbon paper, because of its property of absorbing dimensional changes of electrolyte membrane in the through-plane direction, that is, so-called spring property. A substrate formed of a carbon fiber papermaking substrate bonded with carbide is commonly produced by impregnating a carbon fiber papermaking substrate with resin, followed by carbonization, as described later.

Useful carbon fiber materials include polyacrylonitrile (hereinafter abbreviated as PAN) based, pitch-based, rayon-based, and vapor-grown carbon fiber materials. Among others, PAN-based or pitch-based carbon fiber materials are preferred because they have high mechanical strength.

The carbon fiber 4 preferably has a single-yarn mean diameter of 3 to 20 μm, more preferably 5 to 10 μm. If the mean diameter is 3 μm or more, the pore size will be increased and the water removal performance will be improved, which depresses flooding. If the mean diameter is 20 μm or less, on the other hand, the water vapor diffusivity will be low and drying-out can be depressed. The use of two or more carbon fiber materials with different mean diameters is preferable because the porous carbon fiber base substrate will have an improved surface smoothness. To determine the mean diameter of single carbon fibers, the carbon fiber was photographed under a microscope such as scanning electron microscope at a magnification of 1,000 times or more and 30 single fibers were selected at random and subjected to diameter measurement, followed by calculating the average. Useful scanning electron microscopes include S-4800 manufactured by Hitachi, Ltd., and its equivalents.

The carbon fiber 4 is composed of discontinuous single yarns and, specifically, its mean length is preferably 3 to 20 mm, more preferably 5 to 15 mm. A mean length of 3 mm or more is preferable because the porous carbon fiber base substrate will be high in mechanical strength, electrical conductivity, and thermal conductivity. On the other hand, a mean length of 20 mm or less is preferable because the carbon fiber will have high dispersibility during a paper-making process, leading to a homogeneous porous carbon fiber base substrate. Carbon fiber having such a mean length can be produced by, for example, cutting continuous carbon fiber to a required length.

To determine the mean length of carbon fiber, the carbon fiber was photographed under a microscope such as scanning electron microscope at a magnification of 50 times or more and 30 single fibers were selected at random and subjected to length measurement, followed by calculating the average. Useful scanning electron microscopes include S-4800 manufactured by Hitachi, Ltd., and its equivalents. The mean diameter and mean length of single carbon fibers are commonly determined from direct observations of the carbon fiber that is used as raw material, but they may be determined from observations of the porous carbon fiber base substrate.

The porous carbon fiber base substrate preferably has a pore size of 20 to 80 μm, more preferably 25 to 75 μm, and still more preferably 30 to 70 μm. If the pore size is 20 μm or more, the water removal performance will be improved and flooding will be depressed. If the pore size is 80 μm or less, the electrical conductivity will be high, leading to improved fuel cell performance at both high and low temperatures.

The pore size of the porous carbon fiber base substrate is determined by measuring the pore size distribution by the mercury intrusion technique performed at a measuring pressure of 6 kPa to 414 MPa (pore size 30 nm to 400 μm) and then identifying the peak diameter. If a plurality of peaks appear, the peak diameter for the highest peak is adopted. Useful measuring apparatuses include Autopore 9520 manufactured by SHIMADZU CORPORATION and its equivalents.

The porous carbon fiber base substrate preferably contains carbonaceous particles. The existence of carbonaceous particles improves the electrical conductivity of the porous carbon fiber base substrate itself. The carbonaceous particles preferably have a mean particle size of 0.01 to 10 μm, more preferably 1 to 8 am, and still more preferably 3 to 6 μm. The carbonaceous particles are preferably powder of graphite or carbon black, more preferably graphite powder. The mean particle size of carbonaceous particles can be determined by measuring the particle diameter distribution with the dynamic light scattering technique, followed by calculating the number average.

The porous carbon fiber base substrate has a thickness of 60 to 300 μm, preferably 70 to 250 μm, and more preferably 80 to 200 μm, and has a bulk density of 0.20 to 0.45 g/cm$^3$, preferably 0.22 to 0.43 g/cm$^3$, and more preferably 0.24 to 0.40 g/cm$^3$. If the porous carbon fiber base substrate has a thickness of 60 μm or more, it ensures a high mechanical strength and an easy handling. If the thickness is 300 μm or less, the porous carbon fiber base substrate will have a decreased cross-sectional area and accordingly prevents interception of gas and shifts from a flow channel to an adjacent flow channel, leading to an increased quantity of gas for sweeping away liquid water through the flow channels. Accordingly, this not only prevents plugging, but also shortens the paths for water removal, leading to improved flooding and increased fuel cell performance at low temperatures. If the porous carbon fiber base substrate has a bulk density of 0.20 g/cm$^3$ or more, it ensures a high mechanical strength and an easy handling. A bulk density of 0.45 g/cm$^3$ or less is preferable because it will lead to high water removal performance and high gas diffusivity.

The thickness of the porous carbon fiber base substrate is determined by measuring the thickness while pressing the porous carbon fiber base substrate under a pressure of 0.15 MPa. Specifically, 20 or more different points are selected at random and, while applying a pressure of 0.15 MPa in the through-plane direction of the sheet, thickness measurements are taken at each point using a micrometer with a micrometer head having a circular cross section with a diameter of 5 mm, followed by averaging the thickness measurements taken separately.

The bulk density of the porous carbon fiber base substrate can be determined by cutting out ten 10 cm×10 cm rectangular pieces from the sheet, weighing them on an electronic balance, averaging the measurements to calculate the areal weight (mass per unit area) of the porous carbon fiber base substrate, and dividing it by the thickness of the porous carbon fiber base substrate.

Described in more detail below is an example where carbon paper is used as the porous carbon fiber base substrate.

A papermaking substrate containing carbon fiber and impregnated with a resin composition is referred to as prepreg. To obtain a porous carbon fiber base substrate, it is particularly effective to control the areal weight of the carbon fiber in the prepreg and the weight proportion of the resin components to the carbon fiber. A substrate with a low bulk density can be obtained when using a prepreg with a small areal weight of carbon fiber while a substrate with a high bulk density can be obtained when using a prepreg with a large areal weight of carbon fiber is used. Furthermore, a substrate with a low bulk density can be obtained by decreasing the weight proportion of the resin components to the carbon fiber while a substrate with a high bulk density can be obtained by increasing the weight proportion of the resin components. If there is not a significant difference in areal weight of carbon fiber, a substrate with a low bulk density can be obtained by increasing the thickness of the porous carbon fiber base substrate while a substrate with a high bulk density can be obtained by decreasing its thickness. A porous carbon fiber base substrate having a desired bulk density can be produced by controlling the areal weight of carbon fiber in the prepreg, the weight proportion of the resin components to the carbon fiber, and the thickness of the porous carbon fiber base substrate in carrying out the production method described later.

Described next is the porous layers. Three types of porous layers, categorized as layer (A), porous material (J), and layer (B), are used. In a porous layer, carbonaceous particles commonly account for 5% to 95% in mass percentage of the total quantity.

Layer (A) is a porous layer with a finite mean thickness t1 deposited on one surface, or surface A, of the porous carbon fiber base substrate and it is required to have a high gas diffusivity so that gas supplied from the bipolar plates are allowed to diffuse into the catalyst, high water removal performance so that the water resulting from electrochemical reaction is discharged into the bipolar plates, and high electrical conductivity so that the generated electric currents are taken out efficiently. In addition, it is also required to have a function of promoting the back-diffusion of water into the electrolyte membrane. Accordingly, layer (A) is preferably formed of a porous material having electrical conductivity and a mean pore size of 1 to 10 nm and more specifically, it is preferably formed of a mixture of, for example, carbonaceous particles and a hydrophobic polymer. Useful carbonaceous particle materials include graphite, carbon black, graphene, carbon nanofiber (such as single-walled carbon nanotube, multi-walled carbon nanotube, and vapor grown carbon fiber), and milled carbon fiber, of which carbon black is preferred. It is preferable for these carbonaceous particles to have a particle size of 10 to 200 nm. The particle size of carbonaceous particles should be determined by transmission electron microscopy. Observation by transmission electron microscopy is performed at a magnification of 500,000 and 100 particles are selected in the screen. Their outside diameter is measured and the average of the measurements is adopted as the particle size of the carbon particles. The term "outside diameter" refers to the maximum diameter of a particle (specifically, major axis of the particle, or the largest size across the particle). Useful transmission electron microscopes include JEM-4000EX manufactured by JEOL Ltd. and its equivalents.

The term "carbon black" refers to fine carbon particles in which carbon atoms account for 80% or more and that have a primary particle size of about 3 to 500 nm. The use of carbon black in which carbon atoms account for 80% or more produces a porous layer with a higher electrical conductivity and corrosion resistance. The use of carbon black having a primary particle size of 500 nm or less increases the particle density per unit mass and promotes structural development, leading to layer (A) with improved electrical conductivity and mechanical properties.

Useful carbon black materials include furnace black, channel black, acetylene black, and thermal black. Among others, acetylene black is preferred because of having high electrical conductivity and low impurity content.

To improve electrical conductivity, it is also preferred for layer (A) to contain carbon nanofiber. If containing carbon nanofiber, layer (A) will have a higher void percentage and a higher electrical conductivity. The fiber diameter of the carbon nanofiber is preferably 1 to 1,000 nm, more preferably 10 to 500 nm. If carbon nanofiber with a fiber diameter of less than 1 nm is used, layer (A) will have a poor void percentage, possibly failing to have improved water removal performance as expected. If carbon nanofiber with a fiber diameter of more than 1,000 nm is used, layer (A) will suffer a decrease in smoothness and possibly fail to have improved plugging properties as expected. It may also lead to an increased contact resistance.

Carbon atoms account for 90% or more and the aspect ratio is 10 or more. Since carbon atoms account for 90% or more and the aspect ratio is 10 or more in the carbon nanofiber, the use thereof provides a porous layer with improved electrical conductivity and mechanical properties.

The aspect ratio of carbon nanofiber is defined as the ratio between the fiber diameter and fiber length determined by transmission electron microscopy. Observation by transmission electron microscopy is performed at a magnification of 500,000 and 100 single fibers are selected in the screen. Their diameter and length are measured and the measurements are averaged, followed by dividing the mean fiber length by the mean fiber diameter to calculate the aspect ratio. Useful transmission electron microscopes include JEM-4000EX manufactured by JEOL Ltd. and its equivalents.

Useful carbon nanofiber materials include single-walled carbon nanotube, double-walled carbon nanotube, multi-walled carbon nanotube, carbon nanohorn, carbon nanocoil, cup stacked carbon nanotube, bamboo structured carbon nanotube, vapor grown carbon fiber, and graphite nanofiber. In particular, the use of single-walled carbon nanotube, double-walled carbon nanotube, multi-walled carbon nanotube, or vapor grown carbon is preferred because it ensures a large aspect ratio, high fiber electrical conductivity and good mechanical properties. Vapor grown carbon fiber is produced by growing carbon in a gas phase using a catalyst, and products with a mean diameter of 5 to 200 nm and a mean fiber length of 1 to m are preferred.

To add a hydrophobic polymer with the aim of improving the water removal performance, layer (A) may also contain a hydrophobic polymer additionally in combination with carbonaceous particles such as carbon black and carbon nanofiber described above. Such hydrophobic polymers include fluorine resins such as polychlorotrifluoroethylene resin (PCTFE), polytetrafluoroethylene resin (PTFE), polyvinylidene fluoride resin (PVDF), tetrafluoroethylene-hexa fluoro propylene copolymer (FEP), tetrafluoroethylene-perfluoroalkylvinyl ether copolymer (PFA), and tetrafluoroethylene-ethylene copolymer (ETFE). Fluorine resin refers to a hydrophobic resin containing a fluorine atom in its structure.

If a hydrophobic polymer is added to layer (A), its blending quantity is preferably 1 to 70 parts by mass, more preferably 5 to 60 parts by mass, relative to 100 parts by mass of the carbonaceous particles in layer (A). If the hydrophobic polymer accounts for 1 part by mass or more, layer (A) will improve in water removal performance and mechanical strength while if the hydrophobic polymer accounts for 70 parts by mass or less, layer (A) will improve in electrical conductivity. The carbonaceous particles to be used to form layer (A) may be a mixture of, for example, carbon black such as acetylene black and carbon nanofiber.

It is important for layer (A) to have a mean thickness $t1$ of 10 to 55 μm, preferably 15 to 50 μm, more preferably 20 to 45 μm. If $t1$ is 10 μm or more, the single carbon fibers of the porous carbon fiber base substrate can be prevented from sticking into the electrolyte membrane while if $t1$ is 55 μm or less, layer (A) can decrease in electrical resistance and the number of cracks in the surface of layer (A) can be maintained at a rate of one or less in a 1 mm×1 mm square.

The mean thickness $t1$ of layer (A) can be determined by first measuring the mean thickness of the porous carbon fiber base substrate that contains porous material (J) and layer (B) deposited thereon and then subtracting it from the mean thickness of the entire gas diffusion layer. The thickness of the entire gas diffusion layer and the thickness of the porous carbon fiber base substrate that contains porous material (J) and layer (B) deposited thereon can be measured by the same method as used above for the porous carbon fiber base substrate.

To determine the number of cracks in the surface of layer (A), observation is performed by microscopy such as optical microscopy, to select 5 different portions at random on the surface of layer (A) and photograph them at a magnification of 50 to 100, and the number of isolated cracks existing in an arbitrarily selected 1 mm×1 mm area is counted, followed by averaging the number of cracks found in the photographs. Useful optical microscopes include digital microscopes manufactured by KEYENCE CORPORATION or their equivalents.

Porous material (J) is a porous layer infiltrated inside the porous carbon fiber base substrate and it is required to have a high gas diffusivity so that gas supplied from the bipolar plates are allowed to diffuse into the catalyst, high water removal performance so that the water resulting from electrochemical reaction is discharged into the bipolar plates, and high electrical conductivity so that the generated electric currents are taken out efficiently. In addition, it should be infiltrated inside the porous carbon fiber base substrate to decrease the in-plane gas permeability, thereby preventing plugging. Accordingly, porous material (J) is preferably electrically conductive and formed of a porous material having a mean void size of 1 to 10 nm and more specifically, it may be formed of the same material as in layer (A) preferably such as a mixture of, for example, carbonaceous particles and a hydrophobic polymer. Useful carbonaceous particle materials are as given previously.

The constitution of porous material (J) may be either identical to or different from that of layer (A), but it is preferable for them to be different when porous material (J) and layer (A) are expected to have different functions. Specifically, layer (A) may be required to have a loose structure particularly to realize a high gas diffusivity while porous material (J) may be required to have a dense structure particularly to realize a high electrical conductivity and moisture retention capability. Accordingly, it is better for them to have different constitutions suitable to meet the different purposes.

Compared to this, when the water removal performance for operation in a high humidify environment is to be further improved, it will be preferable for porous material (J) to have the same constitution as that of layer (A). This is also advantageous in that layer (A) and porous material (J) can be prepared from only one dispersion liquid, allowing gas diffusion layers to be produced efficiently.

To improve electrical conductivity, it is preferred for porous material (J), as in layer (A), to contain carbon nanofiber. If containing carbon nanofiber, porous material (J) will have a higher void percentage and a higher electrical conductivity. The fiber diameter of the carbon nanofiber is preferably 1 to 1,000 nm, more preferably 10 to 500 nm. If carbon nanofiber with a fiber diameter of less than 1 nm is used, porous material (J) will have a poor void percentage and fail to have improved water removal performance as expected. If using carbon nanofiber with a fiber diameter of more than 1,000 nm, porous material (J) may fail to infiltrate in sufficient amounts into the porous carbon fiber base substrate and possibly fail to decrease the in-plane gas permeability as expected.

To add a hydrophobic polymer with the aim of improving water removal performance, porous material (J), as in layer (A), may also contain a hydrophobic polymer in combination with the carbon black and carbon nanofiber described above. Examples of the hydrophobic polymer include the fluorine resins listed previously.

The blending quantity of a hydrophobic polymer added to porous material (J) is, as in layer (A), preferably 1 to 70 parts by mass, more preferably 5 to 60 parts by mass, relative to 100 parts by mass of the carbonaceous particles in porous material (J). Addition of a hydrophobic polymer in this range of blending quantity leads to the same advantage as described for layer (A). Useful materials for the carbonaceous particles to be used to form porous material (J) include those listed for layer (A) including a mixture of, for example, carbon black such as acetylene black and carbon nanofiber.

Porous material (J) contains voids 12 as shown in FIG. 1(a) and the void percentage of porous material (J) is preferably 50 to 85%, more preferably 60 to 80%. The gas diffusion layer will have high water removal performance and high gas diffusivity if the void percentage of porous material (J) is 50% or more while porous material (J) will have high mechanical strength if the void percentage of porous material (J) is 85% or less. The void percentage can be controlled by changing the compounding ratio of the carbonaceous particles or the compounding ratio of the hydrophobic polymer.

Porous material (J) infiltrates into the porous carbon fiber base substrate 11 and is at least partially exposed at the other surface, i.e. surface B. As porous material (J) infiltrates into the porous carbon fiber base substrate, voids 12 should be left inside the porous carbon fiber base substrate and their cross-sectional area in the through-plane direction should account for 5 to 40% of the entire cross-sectional area. The proportion of the through-thickness cross-sectional area of the pores left inside the porous carbon fiber base substrate to the entire cross-sectional area is hereinafter referred to as porosity. If the porosity is 5% or more, the gas diffusion layer will have high water removal performance and high gas diffusivity. If the porosity is 40% or less, on the other hand, the in-plane gas permeability will decrease to allow plugging to be prevented. The porosity can be controlled by adjusting the concentration of carbonaceous particles in dispersion liquid (1) that consists mainly of carbonaceous particles and dispersion medium and the concentration of the hydrophobic polymer. Porous material (J) is at least partially exposed at the other surface, i.e. surface B, thereby allowing a reduction in the contact resistance between the gas diffusion layer and the bipolar plate and an increase in power generation efficiency.

Whether porous material (J) exists inside the porous carbon fiber base substrate and is at least partially exposed at the other surface, i.e. surface B, may be determined from observation of a cross section of the gas diffusion layer at a magnification of about 400 by microscopy such as scanning electron microscopy. The expression "porous material (J) exists inside the porous carbon fiber base substrate and is at least partially exposed at the other surface, i.e. surface B," means that porous material (J) is visible in at least part of a cross section and the other surface, i.e. surface B, of the porous carbon fiber base substrate. Porosity can be determined by selecting five (5) different portions at random in a cross section that is perpendicular to the sheet plane of the gas diffusion layer, photographing them by, for example, scanning electron microscopy, at a magnification of about 400, binarizing the images by image processing, measuring the porosity in each portion of the porous carbon fiber base substrate, and averaging the porosity measurements taken separately from the photographs. Image processing can be carried out by, for example, the procedure described below.

The size of the total processing area (number of vertical pixels×number of horizontal pixels) is calculated to determine the total area.

The image is averaged over each nine (9) pixel area (3 vertical pixels×3 horizontal pixels) and the noise per pixel is removed to provide image 1.

From image 1, those regions (porous layer and carbon fiber cross section) that contain non-pore portions and have a luminance that is equal to or greater than an arbitrary mean luminance value or equal to or smaller than an arbitrary mean luminance value are extracted to provide image 2.

From image 2, only those islands that have a size of 100 pixels or more are extracted to provide image 3.

Image 3 is subjected to circular closing processing for a radius of 2.5 pixels (to fill small holes) to provide image 4.

The area of image 4 (i.e., non-pore portion) is determined.

The area of images 4 is subtracted from the total area to calculate the area of pores, which is then divided by the total area to determine the porosity in one portion.

The pore percentage is calculated in this way for the five (5) portions and averaged to provide the mean void percentage. S-4800 manufactured by Hitachi, Ltd., or its equivalent can be used for scanning electron microscopy and HALCON (registered trademark) 9.0 manufactured by MVTec or its equivalent can be used as software for image processing.

It is preferable for the crack frequency in the layer (A) to be lower than the crack frequency in porous material (J). Existing inside the porous carbon fiber base substrate, porous material (J) will suffer little direct load due to expansion or shrinkage of the electrolyte membrane when working in a fuel cell. Layer (A), on the other hand, is liable to such a direct load and accordingly, it is particularly preferable for layer (A) to be low in crack frequency from the viewpoint of durability. From the viewpoint of gas diffusivity, however, a higher crack frequency is preferable. For these two reasons, furthermore, it is preferable for the crack frequency in the layer (A) to be lower than the crack frequency in porous material (J). The crack frequency in the porous layer can be determined by selecting five (5) different portions at random in a cross section perpendicular to the sheet plane of the gas diffusion layer, photographing them by, for example, scanning electron microscopy, at a magnification of about 400, and counting the number of isolated, continuous cracks with a length of 10 μm or more.

In the porous carbon fiber base substrate, layer (B) is one deposited as required on the opposite surface, i.e. surface B, to surface A where layer (A) is deposited. Layer (B), if present, works to prevent plugging more effectively and in particular, further reduce the contact resistance with the bipolar plate. Layer (B), if present, is required to have a high gas diffusivity so that gas supplied from the bipolar plates are allowed to diffuse into the catalyst, high water removal performance so that the water resulting from the electrochemical reaction is discharged into the bipolar plates, and high electrical conductivity so that the generated electric currents are taken out efficiently. To this end, it is preferable for layer (B) to be of a porous material having electrical conductivity and having a mean void size of 1 to 10 nm. More specifically, such materials include those listed for layer (A).

To improve electrical conductivity, it is preferred for layer (B), as in layer (A), to contain carbon nanofiber. If containing carbon nanofiber, layer (B) will have a higher void percentage and a higher electrical conductivity. The fiber diameter of the carbon nanofiber is preferably 1 to 1,000 nm, more preferably 10 to 500 nm. If carbon nanofiber with a fiber diameter of less than 1 nm is used, layer (B) will have a poor void percentage and fail to have improved water removal performance as expected. If carbon nanofiber with a fiber diameter of more than 1,000 nm is used, layer (B) will suffer a decrease in smoothness and possibly fail to have improved plugging properties as expected. It may also lead to an increased contact resistance.

To add a hydrophobic polymer with the aim of improving the water removal performance, layer (B), as in layer (A), may also contain a hydrophobic polymer in combination with the carbon black and carbon nanofiber described above. Examples of the hydrophobic polymer include the fluorine resins listed previously.

The blending quantity of a hydrophobic polymer added to layer (B) is, as in layer (A), preferably 1 to 70 parts by mass, more preferably 5 to 60 parts by mass, relative to 100 parts by mass of the carbonaceous particles in layer (B). Addition of a hydrophobic polymer in this range of blending quantity leads to the same advantage as described for layer (A). Useful materials for the carbonaceous particles to form layer (B) include, for example, those listed for layer (A) including a mixture of, for example, carbon black such as acetylene black and carbon nanofiber.

The mean thickness t2 of layer (B) is preferably 0 to 20 µm, more preferably 3 to 10 µm. If porous material (J) is present inside the porous carbon fiber base substrate and at least partially exposed at the opposite surface, i.e. surface B, as shown in FIG. 1(a), the mean thickness of layer (B) may be substantially 0 µm, which means that deposition of layer (B) may not be required. If layer (B) has a thickness of 3 µm or more over the entirety of the opposite surface, i.e. surface B, as shown in FIG. 1(b), and if it faces a bipolar plate, the interface gap between the bipolar plate and the gas diffusion layer will be small, which serves not only to reduce the in-plane gas permeability and accordingly enhance the plugging prevention effect, but also to further decrease the contact resistance with the bipolar plate as described above, thereby leading to a further increase in power generation efficiency. Compared to this, it is not preferable for layer (B) to have a thickness t2 of more than 20 µm because high water removal performance as expected will not be realized whereas a thickness of 10 µm or less is preferable from the viewpoint of water removal performance. The mean thickness t2 of layer (B) can be determined by subtracting the thickness of the porous carbon fiber base substrate and the mean thickness t1 of layer (A) from the mean thickness of the entire gas diffusion layer.

It is more preferable for layer (B) to have the same constitution as the porous material (J). If layer (B) has the same constitution as the porous material (J), the coating process of forming layer (B) can be eliminated.

Layer (A) should have a void percentage of 50 to 85% and porous material (J) should have a void percentage of 50 to 85%, preferably 60 to 80% for both. The gas diffusion layer will have high water removal performance and high gas diffusivity if the void percentage is 50% or more while the porous layer will have high mechanical strength if the void percentage is 85% or less. In addition, it is more preferable also for layer (B) to have a void percentage in the above-mentioned range. In particular, it is preferable for the void percentage of layer (A) to be higher than either the void percentage of layer (B) or the void percentage of porous material (J). If layer (B) is not present, it is preferable for the void percentage of layer (A) to be higher than the void percentage of porous material (J). It is preferable for the void percentage of layer (A) to be higher than the void percentage of layer (B) or the void percentage of porous material (J) because it serves to maintain the gas diffusivity at a sufficiently high level. The void percentage can be controlled by changing the compounding ratio of the carbonaceous particles or the compounding ratio of the hydrophobic polymer.

For layer (A), layer (B), and porous material (J), the void percentage can be determined by observing each layer by, for example, scanning electron microscopy, selecting five (5) different portions at random in a cross section perpendicular to the sheet plane of the gas diffusion layer, photographing them at a magnification of about 20,000, binarizing the images by image processing, measuring the void percentage using the binarized images, and averaging the void percentage measurements taken separately from the photographs. Image processing can be carried out by, for example, the procedure described below.

The size of the total processing area (number of vertical pixels×number of horizontal pixels) is calculated to determine the total area.

The image is averaged over each nine (9) pixel area (3 vertical pixels×3 horizontal pixels) and the noise per pixel is removed to provide image 1.

From image 1, those regions (porous layer cross section) that contain non-void portions and have a luminance that is equal to or greater than an arbitrary mean luminance value are extracted to provide image 2.

From image 2, only those islands that have a size of 100 pixels or more are extracted to provide image 3.

Image 3 is subjected to circular closing processing for a radius of 2.5 pixels (to fill small holes) to provide image 4. An example of image 4 is shown in FIG. 2.

The area of image 4 (i.e., non-void portion) is determined.

The area of image 4 is subtracted from the total area to calculate the area of voids, which is then divided by the total area to determine the void percentage in one portion.

The void percentage is calculated in this way for the 5 portions and averaged to provide the mean void percentage. S-4800 manufactured by Hitachi, Ltd., or its equivalent can be used for scanning electron microscopy and HALCON (registered trademark) 9.0 manufactured by MVTec or its equivalent can be used as software for image processing.

A method of producing the gas diffusion layer is described in detail below.

Carbon Fiber Non-Woven Fabric

Methods of producing nonwoven fabric containing carbon fiber include a wet method in which carbon fiber is dispersed in a liquid and a dry method in which it is dispersed in air. In particular, it has been preferred to use the wet papermaking method, which can produce thin carbon fiber non-woven fabric. Carbon fiber non-woven fabric produced by the wet papermaking method is referred to as carbon fiber papermaking substrate.

It is preferable to add pulp to carbon fiber used for the papermaking method with the aim of lowering the in-plane gas permeability. Useful pulp materials include natural pulp materials such as wood pulp, bagasse pulp, and straw pulp and synthetic pulp materials such as fibrillated polyethylene fiber, vinylon fiber, polyacetal fiber, polyester fiber, polyamide fiber, rayon fiber, acrylic fiber, and aramid fiber.

Carbon fiber non-woven fabrics to be used are preferably in the form of a sheet in which carbon fiber is dispersed randomly in a two-dimensional plane so that isotropic electrical conductivity and thermal conductivity are maintained in the plane.

The pore size distribution in nonwoven fabric tends to be influenced by the content and dispersion state of carbon fibers, but pores with a size of about 20 to 100 µm may be formed.

The carbon fibers in the nonwoven fabric preferably have an areal weight of 10 to 60 g/m$^2$, more preferably 20 to 50 g/m$^2$. The porous carbon fiber base substrate will have high mechanical strength if the carbon fibers have an areal weight of 10 g/m$^2$ or more while the porous carbon fiber base substrate will have high gas diffusivity and high water removal performance if it is 60 g/m$^2$ or less. If a plurality of nonwoven fabric sheets are stuck, it is preferable for the carbon fiber to have an areal weight in the above range after the pasting.

The areal weight of carbon fiber in a porous carbon fiber base substrate can be determined by cutting out a 10 cm×10 cm piece from a nonwoven fabric sheet, leaving it in a nitrogen atmosphere at a temperature of 450° C. for 15 minutes in an electric furnace, and dividing the mass of the residue by the area (0.01 µm$^2$) of the piece of nonwoven fabric.

Production Method for Prepreg

Nonwoven fabric containing carbon fiber is impregnated with a resin composition to prepare a prepreg. Useful methods of impregnating nonwoven fabric containing carbon fiber with a resin composition include a method of dipping nonwoven fabric in a solution containing resin composition, a method of coating nonwoven fabric with a solution containing resin composition, a method of putting a film formed of a resin composition on nonwoven fabric and transferring it. Of these, the method of dipping nonwoven fabric in a solution containing resin composition is preferred because a high productivity is ensured.

The resin composition should be one that can be carbonized when baked, to form an electrically conductive carbide, i.e., carbonized material 13. Thus, the baked material has a structure in which discontinuous carbon fibers are bonded to each other with the carbide carbonized material 13 as shown in FIGS. 1(*a*) and 1(*b*). The resin composition is a mixture of resin components mixed as required with a solvent and the like. The resin components include resin such as thermosetting resin, and other required additives such as carbon based filler and surfactant. The carbonization yield of the resin components contained in the resin composition is preferably 40 mass % or more. A carbonization yield of 40 mass % or more is preferable because the porous carbon fiber base substrate will have good mechanical properties, high electrical conductivity, and high thermal conductivity. A higher carbonization yield is more favorable, but at the current technical level, it is generally 70 mass % or less.

Useful resins to constitute the resin components include thermosetting resins such as phenol resin, epoxy resin, melamine resin, and furan resin. Of these, phenol resin is preferred because of a high carbonization yield. Furthermore, additives that can be added to the resin components as required include carbon based fillers such as the carbonaceous particles listed previously, which may be used with the aim of improving the mechanical properties, electrical conductivity, and thermal conductivity of porous carbon fiber base substrates. Useful carbon based fillers include carbon black, carbon nanotube, carbon nanofiber, milled carbon fiber, and graphite.

As the resin compositions, those resin components described above may be used as they are, but may also contain various solvents as required to enhance the impregnating ability for papermaking substrates. Useful solvents include water, methanol, ethanol, isopropyl alcohol, and acetone.

The resin components used for impregnation preferably account for 30 to 400 parts by mass, more preferably 50 to 300 parts by mass, relative to 100 parts by mass of the carbon fiber. If the impregnation quantity of the resin component is 30 parts by mass or more, it is preferable because the porous carbon fiber base substrate will have good mechanical properties, high electrical conductivity, and high thermal conductivity. If the impregnation quantity of the resin component is 400 parts by mass or less, it is preferable because the porous carbon fiber base substrate will have high gas diffusivity.

Pasting and Annealing

After prepreg formation, lamination and annealing of prepreg sheets may be performed before carbonization. A plurality of prepreg sheets may be laminated together with the aim of providing a porous carbon fiber base substrate with a predetermined thickness. In this case, a plurality of prepreg sheets with identical properties may be laminated together or a plurality of prepreg sheets with different properties may be laminated together. Specifically, a plurality of prepreg sheets that differ in mean diameter and mean length of single carbon fibers, areal weight of carbon fiber in the papermaking substrate, and impregnation quantity of the resin components may be laminated together.

The prepreg may be annealed with the aim of increasing the viscosity of the resin composition or partially cross-linking it. Useful annealing methods include a method of blowing hot air, a method of heating between hot plates in a press apparatus and the like, and a method of heating between continuous belts.

Carbonization

After impregnating carbon fiber non-woven fabric with a resin composition, it is baked in an inert atmosphere for carbonization. Such baking may be performed by using either a batch type heating furnace or a continuous heating furnace. Such an inert atmosphere can be created by causing an inert gas such as nitrogen gas and argon gas, to flow through the furnace.

The maximum baking temperature is preferably 1,300° C. to 3,000° C., more preferably 1,700° C. to 2,850° C., and still more preferably 1,900° C. to 2,700° C. A maximum temperature of 1,300° C. or more is preferable because the resin components will be carbonized to a high degree and the porous carbon fiber base substrate will have high electrical conductivity and high thermal conductivity. On the other hand, a maximum temperature of 3,000° C. or less is preferable because the required heating furnace operation cost will decrease. Nonwoven fabric containing carbon fiber impregnated with a resin composition and then carbonized is referred to as a porous carbon fiber base substrate.

Hydrophobic Treatment

The porous carbon fiber base substrate may be subjected to hydrophobic treatment with the aim of improving its water removal performance. Hydrophobic treatment may be carried out by adding a hydrophobic polymer to the porous carbon fiber base substrate. There are no specific limitations on the hydrophobic polymer, but, for example, the fluorine resins listed previously may be used. In regard to the quantity of the hydrophobic polymer to be added, it preferably accounts for 1 to 50 parts by mass, more preferably 3 to 40 parts by mass, relative to 100 parts by mass of the porous carbon fiber base substrate. The porous carbon fiber base substrate will have high water removal performance if the hydrophobic polymer accounts for 1 part by mass or more while the porous carbon fiber base substrate will be high in electrical conductivity if it accounts for 50 parts by mass or less.

If the hydrophobic polymer is unevenly distributed with a higher concentration near layer (A), which is described later, in the porous carbon fiber base substrate, it is preferable because the required quantity of the expensive hydrophobic polymer can be minimized without suffering a performance deterioration for water removal from the catalyst layer to the bipolar plate. A useful method of checking for such an uneven distribution of the hydrophobic polymer in the porous carbon fiber base substrate is to observe a cross section of the gas diffusion layer at a magnification of 400 by microscopy such as scanning electron microscopy, and analyze the fluorine concentration distribution in a cross-sectional direction by using an energy dispersive X-ray spectrometry, electron probe microanalyzer and the like.

Described next is the first preferred method of forming a porous layer in a porous carbon fiber base substrate.

Impregnation Process (I): Formation of Porous Material (J)

Porous material (J) is formed by dispersing carbonaceous particles in a dispersion medium such as water and organic solvent to prepare dispersion liquid (1) and infiltrating it into a porous carbon fiber base substrate. Commonly, a hydrophobic polymer such as the one used for the hydrophobic treatment described above, is added to dispersion liquid (1). Useful infiltration methods include dipping, die coating, kiss coating, screen printing, rotary screen printing, spraying, intaglio printing, gravure printing, bar coating, and blade coating, of which dipping is preferred because it can realize uniform infiltration. The constitution and solid content of the dispersion liquid may be adjusted appropriately to ensure a void percentage of 5% to 40% after the impregnation.

Dispersion liquid (1), as well as dispersion liquid (2) and dispersion liquid (3), which are described later, may contain a dispersant such as surfactant. For dispersion liquid (1), as well as dispersion liquid (2) and dispersion liquid (3), which are described later, water is preferably used as the dispersion medium and a nonionic surfactant is preferably used as the dispersant.

Squeezing Process (I-2)

After process (I), a void percentage of 5% to 40% may be realized by removing an excess of dispersion liquid (1) from the surface of the porous carbon fiber base substrate using a blade or squeeze roller. The blade may be of an appropriately selected material such as rubber, plastic, and metal. The squeeze roller may also be of an appropriately selected material such as rubber, plastic, and metal, and an appropriately selected method such as nipping and clearance may be used.

Drying Process (I'): Drying of Porous Material (J)

After undergoing impregnation process (I), and squeeze process (I-2) as required, the porous carbon fiber base substrate is preferably deprived (dried) of the dispersion medium in dispersion liquid (1) by heating at a temperature of 80° C. to 200° C. before feeding it to the subsequent processes.

Deposit Process (II): Formation of Layer (A)

Layer (A) is formed by coating one surface, i.e. surface A, of a porous carbon fiber base substrate with dispersion liquid (2) prepared by dispersing carbonaceous particles in a dispersion medium such as water and organic solvent. Commonly, a hydrophobic polymer such as the one used for the hydrophobic treatment described above, is added to dispersion liquid (2). Useful coating methods include die coating, kiss coating, screen printing, rotary screen printing, spraying, intaglio printing, gravure printing, bar coating, and blade coating, of which die coating is preferred because it allows quantification of the coating weight regardless of the surface roughness of the porous carbon fiber base substrate.

Drying Process (II'): Drying of Layer (A)

After undergoing deposit process (II), the porous carbon fiber base substrate is preferably deprived (dried) of the dispersion medium in dispersion liquid (2) by heating at a temperature of 80° C. to 200° C. before feeding it to the subsequent processes.

Furthermore, if a fuel cell gas diffusion layer is produced in which layer (A) and porous material (J) have the same constitution in forming porous layers on the porous carbon fiber base substrate, the second method that contains deposit-impregnation process (II-3) described below instead of the process described above may be adopted.

Deposit-Impregnation Process (II-3)

Layer (A) is formed by coating one surface, i.e. surface A, of a porous carbon fiber base substrate with dispersion liquid (2) prepared by dispersing carbonaceous particles in a dispersion medium such as water and organic solvent and, while leaving part of dispersion liquid (2) at the surface, allowing the remaining part of dispersion liquid (2) to infiltrate into the porous carbon fiber base substrate. Commonly, a hydrophobic polymer such as the one used for the hydrophobic treatment described above, is added to dispersion liquid (2). Useful coating methods include die coating, kiss coating, screen printing, rotary screen printing, spraying, intaglio printing, gravure printing, bar coating, and blade coating, of which die coating is preferred because it allows precise control of the coating weight regardless of the surface roughness of the porous carbon fiber base substrate and ensures easy control of the degree of infiltration into the porous carbon fiber base substrate. If using the die coating technique, the degree of infiltration of dispersion liquid (2) into the porous carbon fiber base substrate can be controlled by adjusting the coating rate, discharge rate, clearance between the discharge rip and the porous carbon fiber base substrate, viscosity of the dispersion liquid and the like.

Drying Process (II-3'): Drying of Layer (A)

After undergoing deposit-impregnation process (II-3), the porous carbon fiber base substrate is preferably deprived (dried) of the dispersion medium in dispersion liquid (2) by heating at a temperature of 80° C. to 200° C. before feeding it to the subsequent processes.

Opposite Surface Deposit Process (II-2): Formation of Layer (B)

After undergoing deposit process (II) or deposit-impregnation process (II-3), the porous carbon fiber base substrate is subjected to a porous layer (B) formation process as required. Layer (B) is formed by coating the opposite surface, i.e. surface B, which is located opposite to the surface coated with layer (A), i.e. surface A of the porous carbon fiber base substrate, with dispersion liquid (3) prepared by dispersing carbonaceous particles in a dispersion medium such as water and organic solvent. Commonly, a hydrophobic polymer such as the one used for the hydrophobic treatment described above, is added to dispersion liquid (3). Useful coating methods include die coating, kiss coating, screen printing, rotary screen printing, spraying, intaglio printing, gravure printing, bar coating, and blade coating, of which kiss coating and screen printing are preferred because they serve for easy control of the coating weight in coating the opposite surface compared to the other techniques.

If impregnation process (I) is to be adopted, it is also preferable that layer (B), which has the same composition as porous material (J), be formed at least on one surface of the porous carbon fiber base substrate when porous material (J) is formed. In this case, opposite surface deposit process (II-2) and drying process (II-2') can be omitted.

Drying Process (II-2'): Drying of Layer (B)

After undergoing opposite surface deposit process (II-2), the porous carbon fiber base substrate is preferably deprived (dried) of the dispersion medium in dispersion liquid (3) by heating at a temperature of 80° C. to 200° C. before feeding it to the subsequent processes.

Sintering Process (III):

After undergoing deposit process (II) or deposit-impregnation process (II-3), the porous carbon fiber base substrate is subjected to drying process (II'), opposite surface deposit process (II-2), drying process (II-2'), and drying process (II-3') as required, and then fed to or sent through a muffle furnace, baking furnace, or high-temperature type drying furnace where it is sintered by heating at 300° C. to 380° C. for 1 to 30 minutes. If a hydrophobic polymer exists, it is melted during the sintering process and acts to bind the carbonaceous particles to form a porous layer.

The coating techniques described above are only given as samples, and our methods are not limited thereto.

A membrane electrode assembly (MEA) and fuel cell that use the gas diffusion layer are described next with reference to FIG. 3.

A membrane electrode assembly can be produced by forming catalyst layers 9 on both surfaces of a solid polymer electrolyte membrane 8 and then attaching a gas diffusion layer as described above to at least one side thereof. In doing this, it is preferable to deposit layer (A) 1 on the catalyst layer 9, that is, structure the membrane electrode assembly such that layer (A) 1 comes in contact with the catalyst layer 9.

Bipolar plates (not shown in Figure) are then formed on both sides of the membrane electrode assembly to form a fuel cell. Commonly, a gasket is provided between each bipolar plate and the relevant surface of the membrane electrode assembly and a plurality of such laminates are stacked to produce a polymer electrolyte fuel cell. The catalyst layer 9 includes a layer containing a solid polymer electrolyte and carbon material of carbon-supported catalyst. Platinum is commonly used as the catalyst. For a fuel cell in which reformed gas containing carbon monoxide is supplied to the anode, it is preferable to adopt platinum or ruthenium as the catalyst in the anode. The solid polymer electrolyte is preferably of perfluorosulfonic acid based polymer material which is high in protonic conductivity, oxidation resistance, and heat resistance. For fuel cell units and fuel cells, such structural features themselves have been well known.

EXAMPLES

Our layers and methods are described more specifically below with reference to Examples. The measuring methods used to determine various characteristics in Examples are described below.

Measurement of Thickness of Entire Gas Diffusion Layer

The thickness of the porous carbon fiber base substrate, thickness of the entire gas diffusion layer, and thickness of the porous carbon fiber base substrate having porous material (J) and layer (B) deposited thereon were measured as follows. Specifically, 20 different points were selected at random on a sheet-like specimen to be examined and the thickness was measured at each point under a pressure of 0.15 MPa using a MF-501 micrometer, which is equipped with a micrometer head having a circular cross section with a diameter of 5 mm, manufactured by Nikon Corporation, followed by averaging the individual thickness measurements.

Measurement of Thickness t1 of Layer (A)

The mean thickness t1 of layer (A) was determined by first measuring the mean thickness of the porous carbon fiber base substrate that has porous material (J) and layer (B) deposited thereon and then subtracting it from the mean thickness of the entire gas diffusion layer.

Measurement of Thickness t2 of Layer (B)

The mean thickness t2 of layer (B) was determined by subtracting the thickness of the porous carbon fiber base substrate and the mean thickness t1 of layer (A) from the mean thickness of the entire gas diffusion layer.

Measurement of Bulk Density of Porous Carbon Fiber Base Substrate

The bulk density of a porous carbon fiber base substrate is determined by measuring the areal weight (mass per unit area) of the porous carbon fiber base substrate using an electronic balance and dividing it by the thickness of the porous carbon fiber base substrate.

Porosity

The gas diffusion layer was cut in a direction perpendicular to the sheet plane and subjected to preliminary treatment, and a section for cross-sectional observation was prepared by using a SM-9010 cross section polisher manufactured by JEOL Ltd.

Then, a photograph containing the entire thickness of the gas diffusion layer was taken at a magnification of 400 using an S-4800 field emission-type scanning electron microscope (FE-SEM) manufactured by Hitachi High-Technologies Corporation and we found that layer (A) had been deposited on one surface of the porous carbon fiber base substrate, that porous material (J) had infiltrated into the porous carbon fiber base substrate and at least partially reached the other surface, i.e. surface B, and that pores were maintained in the porous carbon fiber base substrate. Five different points were selected at random in a cross section and the measurements taken at these points were image-processed as described below by HALCON 9.0 image processing software manufactured by MVTec to provide binarized data, from which porosity was determined for each point.

(Image Processing)

The size of the total processing area (number of vertical pixels×number of horizontal pixels) was calculated to determine the total area.

The image was averaged over each nine (9) pixel area (3 vertical pixels×3 horizontal pixels) and the noise per pixel is removed to provide image 1.

From image 1, those regions (porous layer and carbon fiber cross section) that contained non-pore portions and had a luminance that was equal to or greater than an arbitrary mean luminance value or equal to or smaller than an arbitrary mean luminance value were extracted to provide image 2.

From image 2, only those islands that had a size of 100 pixels or more were extracted to provide image 3.

Image 3 was subjected to circular closing processing for a radius of 2.5 pixels (to fill small holes) to provide image 4.

The area of image 4 (i.e., non-pore portion) was determined.

The area of images 4 was subtracted from the total area to calculate the area of pores, which was then divided by the total area to determine the porosity in one portion.

The porosity was calculated in this way for the five (5) portions and averaged to provide the mean porosity.

Void Percentage of Porous Layer

Specimens similar to those used for porosity determination were prepared.

Five different points were selected at random in a cross section of a specimen of the porous layer and observed at a magnification of 20,000 using an S-4800 field emission-type scanning electron microscope (FE-SEM) manufactured by Hitachi High-Technologies Corporation and the measurements taken at these points were image-processed as described below by using HALCON 9.0 image processing software manufactured by MVTec to provide binarized data, from which void percentage was determined for each point.

(Image Processing)

The size of the total processing area (number of vertical pixels×number of horizontal pixels) was calculated to determine the total area.

The image was averaged over each nine (9) pixel area (3 vertical pixels×3 horizontal pixels) and the noise per pixel is removed to provide image 1.

From image 1, those regions (porous layer cross section) that contain non-void portions and have a luminance that is equal to or greater than an arbitrary mean luminance value are extracted to provide image 2.

From image 2, only those islands that had a size of 100 pixels or more were extracted to provide image 3.

Image 3 was subjected to circular closing processing for a radius of 2.5 pixels (to fill small holes) to provide image 4.

The area of image 4 (i.e., non-void portion) was determined.

The area of image 4 was subtracted from the total area to calculate the area of voids, which was then divided by the total area to determine the void percentage in one portion.

The void percentage was calculated in this way for the five (5) portions and averaged to provide the mean void percentage.

Number of Cracks in the Surface of Layer (A) and Layer (B)

Observation was performed at a magnification of 50 using a digital microscope manufactured by KEYENCE CORPORATION to determine the number of isolated cracks in an arbitrarily selected 1 mm×1 mm area.

Evaluation of Fuel Cell Performance of Polymer Electrolyte Fuel Cell

First, 1.00 g of carbon material of carbon-supported platinum catalyst (manufactured by Tanaka Kikinzoku Kogyo K.K., platinum supporting amount 50 mass %), 1.00 g of purified water, 8.00 g of a NAFION (registered trademark) solution (manufactured by Aldrich, NAFION (registered trademark) 5.0 mass %), and 18.00 g of isopropyl alcohol (manufactured by Nacalai Tesque, Inc.) were added in this order to prepare a catalyst paste.

The catalyst paste was sprayed over a 7 cm×7 cm piece of NAFLON (registered trademark) PTFE tape TOMBO (registered trademark) No. 9001 (manufactured by NICHIAS Corporation) and dried at room temperature to prepare a PTFE sheet carrying a catalyst layer with a platinum quantity of 0.3 mg/cm$^2$. Then, a 10 cm×10 cm piece of a NAFION (registered trademark) NRE-211cs solid polymer electrolyte membrane (manufactured by DuPont) was sandwiched between two catalyst layer-covered PTFE sheets and hot-pressed at 130° C. under a pressure of 5 MPa in a pressing machine with flat plate to transfer the catalyst layer to the solid polymer electrolyte membrane. After the pressing, the PTFE sheets were removed to provide a solid polymer electrolyte membrane carrying a catalyst layer.

Then, the solid polymer electrolyte membrane carrying a catalyst layer was sandwiched between two 7 cm×7 cm gas diffusion layers and hot-pressed at 130° C. under a pressure of 3 MPa in a pressing machine with flat plate to prepare a membrane electrode assembly. The gas diffusion layer was disposed such that layer (A) was in contact with the catalyst layer.

The resulting membrane electrode assembly was incorporated in a fuel cell evaluation unit cell and the current density was measured at different voltages. The bipolar plates used were serpentine, single-flow-channel type ones with a channel width of 1.5 mm, channel depth of 1.0 mm, and rib width of 1.1 mm. For evaluation, hydrogen compressed at 210 kPa was supplied to the anode while air compressed at 140 kPa was supplied to the cathode. It should be noted that both hydrogen and air were humidified by a humidification pot set at 70° C. The utilization ratio of hydrogen and that of oxygen in air were 80% and 67%, respectively.

First, the output voltage was measured at an operation temperature maintained at 65° C. and a current density set to 2.2 A/cm$^2$ and used as indicator of the anti-flooding characteristic (low temperature performance). The anti-plugging characteristic was evaluated based on observations of the frequency of instantaneous drop in fuel cell performance during a 30 minute period in which the current density was maintained at 2.2 A/cm$^2$. Specifically, the number of times the output voltage dropped below 0.2 V during the 30 minute period was counted, and the specimen was ranked as C if such a drop occurred 7 times or more, B if it occurred 5 or 6 times, A if it occurred 3 or 4 times, and S if it occurred twice or less. Then, the current density was set to 1.2 A/cm$^2$ and the operation temperature, starting at 80° C., was maintained for 5 minutes and raised by 2° C. in 5 minutes. This procedure was repeated while measuring the output voltage to determine the upper limit temperature where power generation can be performed, which was adopted as indicator of the anti-dry-out characteristic (high temperature performance).

Example 1

Polyacrylonitrile based carbon fiber, TORAYCA (registered trademark) T300 manufactured by Toray Industries, Inc. (mean single fiber diameter 7 μm), was cut to 12 mm length and subjected to a papermaking process in which the fiber undergo sheet-making processing using water as sheet-making medium, dipping in a 10 mass % aqueous solution of polyvinyl alcohol, and drying, thereby providing a long piece of carbon fiber paper with an areal weight of carbon fiber of 16 g/m$^2$. The polyvinyl alcohol attached to the fiber accounted for 20 parts by mass relative to 100 parts by mass of carbon fiber.

A dispersion liquid consisting of flake graphite (mean particle diameter 5 μm), phenol resin, and methanol mixed at a ratio by mass of 1:9:50 was prepared. The carbon fiber paper was continuously impregnated with the above dispersion liquid such that the phenol resin accounted for 104 parts by mass relative to 100 parts by mass of the carbon fiber and the resin impregnation process was finished at a temperature of 90° C. to provide resin-impregnated carbon fiber paper (prepreg). The phenol resin used was a mixture of resol type phenolic resin and novolak type phenolic resin mixed at a ratio by mass of 1:1.

A pressing machine was set so that the upper and lower hot plates were parallel to each other and the resin-impregnated carbon fiber paper was subjected to compression treatment to allow it to be heated and compressed at a hot plate temperature of 170° C. and a pressure of 0.8 MPa.

The compression-treated carbon fiber paper, used as precursory fiber sheet, was fed to a heating furnace that maintains a nitrogen gas atmosphere with a maximum temperature of 2,400° C., and then carbonized to provide a porous carbon fiber base substrate with a thickness of 100 μm, areal weight of 24 g/m$^2$, and bulk density of 0.24 g/cm$^3$.

PTFE resin was added at a ratio of 5 parts by mass relative to 95 parts by mass of the porous carbon fiber base substrate and heat-drying was performed at 100° C. to provide a hydrophobic-treated substrate.

Formation of Layer (A), Porous Material (J), and Layer (B)

The dispersion liquid designed to form porous material (J) is referred to dispersion liquid (1); the dispersion liquid designed to form layer (A) is referred to dispersion liquid (2); and the dispersion liquid designed to form layer (B) is referred to dispersion liquid (3).

Dispersion liquid (1) was prepared by mixing carbon black, namely acetylene black, and other components, namely PTFE resin dispersion, surfactant, and purified water, mixed at a carbon black/PTFE resin ratio of 75 parts by mass to 25 parts by mass with the solid components accounting for 15 mass % of the total quantity. Dispersion liquid (1) was found to have a viscosity of 34 mPa·s when examined with a B type viscometer.

Dispersion liquid (1) was put in a stainless steel tray and a porous carbon fiber base substrate was completely dipped in dispersion liquid (1). The liquid attached to the surface was scraped off with a stainless steel spatula and heat-drying performed at 120° C. to provide an impregnated substrate having an impregnation rate of 15 g/m$^2$ after sintering.

Dispersion liquid (2) was prepared by mixing carbon black, namely acetylene black, and other components, namely PTFE resin dispersion, surfactant, and purified water, mixed at a carbon black/PTFE resin ratio of 75 parts by mass to 25 parts by mass with the solid components accounting for 22 mass % of the total quantity.

Dispersion liquid (2) was applied to the impregnated substrate using a die coater and heat-drying performed at 120° C. to provide a coated substrate.

The heat-dried coated substrate was heated at 380° C. to prepare a gas diffusion layer including a porous carbon fiber base substrate that contains porous material (J) in its interior and has layer (A) on one surface. Layer (A) had a mean thickness t1 (m) of 40 μm and layer (A) had an areal weight of 20 g/m$^2$. We found that porous material (J) was exposed in some parts of the opposite surface, i.e. surface B, of the porous carbon fiber base substrate. Those parts of porous material (J) existing at the opposite surface, i.e. surface B, were defined as layer (B) with a mean thickness of t2 (μm) of 0 μm.

The porosity of the resulting gas diffusion layer was calculated at 31% and the void/pore percentage of porous material (J) and layer (A) in the resulting gas diffusion layer was calculated at 52% for porous material (J) and 75% for layer (A).

Furthermore, the resulting gas diffusion layer was examined for cracks in the surface of layer (A), but no cracks were found.

For the resulting gas diffusion layer, fuel cell performance was evaluated and results showed a very good anti-plugging characteristic. The output voltage was 0.38 V (operation temperature 65° C., humidification temperature 70° C., current density 2.2 A/cm$^2$) and the upper limit temperature was 91° C. (humidification temperature 70° C., current density 1.2 A/cm$^2$), representing a good anti-flooding characteristic and anti-dry-out characteristic as seen in Table 1.

Example 2

Except that layer (A) had a mean thickness t1 (m) of 15 μm and that layer (A) had an areal weight of 8 g/m$^2$ after sintering, the same procedure as in Example 1 "Formation of layer (A), porous material (J), and layer (B)" was carried out to produce a gas diffusion layer. Evaluation results of the fuel cell performance of this gas diffusion layer showed a good anti-plugging characteristic. The output voltage was 0.37 V (operation temperature 65° C., humidification temperature 70° C., current density 2.2 A/cm$^2$) and the upper limit temperature was 90° C. (humidification temperature 70° C., current density 1.2 A/cm$^2$), representing a good anti-flooding characteristic and anti-dry-out characteristic as seen in Table 1. No cracks were found in the surface of layer (A).

Example 3

Except that layer (A) had a mean thickness t1 (m) of 52 μm and that layer (A) had an areal weight of 26 g/m$^2$ after sintering, the same procedure as in Example 1 "Formation of layer (A), porous material (J), and layer (B)" was carried out to produce a gas diffusion layer. Evaluation results of the fuel cell performance of this gas diffusion layer showed a very good anti-plugging characteristic. The output voltage was 0.36 V (operation temperature 65° C., humidification temperature 70° C., current density 2.2 A/cm$^2$) and the upper limit temperature was 90° C. (humidification temperature 70° C., current density 1.2 A/cm$^2$), representing a good anti-flooding characteristic and anti-dry-out characteristic as seen in Table 1. One crack was found in the surface of layer (A).

Example 4

As described in Example 1 "Formation of layer (A), porous material (J), and layer (B)", dispersion liquid (1) was put in a stainless steel tray and a porous carbon fiber base substrate completely dipped in dispersion liquid (1). Then, except that the liquid attached to the surface was not scraped off with a stainless steel spatula before heat-drying at 120° C., that layer (B) with a mean thickness t2 (μm) of 10 μm was formed over the entirety of the opposite surface, i.e. surface (B), of the porous carbon fiber base substrate, and that an impregnated substrate having an impregnation rate of 22 g/m$^2$ (porous material (J) 15 g/m$^2$+layer (B) 7 g/m$^2$) after sintering was obtained, the same procedure as in Example 1 was carried out to produce a gas diffusion layer. Evaluation results of the fuel cell performance of this gas diffusion layer showed a very good anti-plugging characteristic. The output voltage was 0.33 V (operation temperature 65° C., humidification temperature 70° C., current density 2.2 A/cm$^2$) and the upper limit temperature was 92° C. (humidification temperature 70° C., current density 1.2 A/cm$^2$), representing a good anti-flooding characteristic and anti-dry-out characteristic as seen in Table 1. No cracks were found in the surface of layer (A).

Example 5

In Example 1 "Formation of layer (A), porous material (J), and layer (B)", dispersion liquid (1) prepared had a carbon black/PTFE resin ratio of 75 parts by mass to 25 parts by mass and a solid content of 21%. This dispersion liquid (1) was found to have a viscosity of 46 mPa·s when examined with a B type viscometer. This dispersion liquid (1) was put in a stainless steel tray and a porous carbon fiber base substrate completely dipped in this dispersion liquid (1). The liquid attached to the surface was scraped off with a stainless steel spatula and heat-drying performed at 120° C. to provide an impregnated substrate having an impregnation rate of 29 g/m$^2$ after sintering. Except for this, the same procedure as in Example 1 was carried out to produce a gas diffusion layer. This gas diffusion layer had a porosity of 10%. Evaluation results of the fuel cell performance of this gas diffusion layer showed a very good anti-plugging characteristic. The output voltage was 0.33 V (operation temperature 65° C., humidification temperature 70° C., current density 2.2 A/cm$^2$) and the upper limit temperature was 92° C. (humidification temperature 70° C., current density 1.2 A/cm$^2$), representing a good anti-flooding characteristic and anti-dry-out characteristic as seen in Table 1. No cracks were found in the surface of layer (A).

Example 6

In Example 1 "Formation of layer (A), porous material (J), and layer (B)", dispersion liquid (1) prepared had a carbon black/PTFE resin ratio of 75 parts by mass to 25 parts by mass and a solid content of 7%. This dispersion liquid (1) was found to have a viscosity of 16 mPa·s when examined with a B type viscometer. This dispersion liquid (1) was put in a stainless steel tray and a porous carbon fiber base substrate completely dipped in this dispersion liquid (1). The liquid attached to the surface was scraped off with a stainless steel spatula and heat-drying performed at 120° C. to provide an impregnated substrate having an impregnation rate of 8 g/m$^2$ after sintering. Except for this, the same procedure as in Example 1 was carried out to produce a gas diffusion layer. This gas diffusion layer had a porosity of 38%. Evaluation results of the fuel cell performance of this gas diffusion layer showed a good anti-plugging characteristic. The output voltage was 0.38 V (operation temperature 65° C., humidification temperature 70° C., current density 2.2 A/cm$^2$) and the upper limit temperature was 90° C. (humidification temperature 70° C., current density 1.2 A/cm$^2$), representing a good anti-flooding characteristic and anti-dry-out characteristic as seen in Table 1. No cracks were found in the surface of layer (A).

Example 7

In Example 1 "Formation of layer (A), porous material (J), and layer (B)", dispersion liquid (2) prepared had a carbon black/PTFE resin/surfactant/purified water ratio of 75 parts by mass to 25 parts by mass and a solid content of 22%, and except for this, the same procedure as in Example 1 was carried out to produce a gas diffusion layer. Layer (A) produced from this dispersion liquid (2) had a mean thickness t1 (μm) of 43 μm, an areal weight of 20 g/m$^2$, and a void percentage of 80%. Evaluation results of the fuel cell performance of this gas diffusion layer showed a very good anti-plugging characteristic. The output voltage was 0.39 V (operation temperature 65° C., humidification temperature 70° C., current density 2.2 A/cm$^2$) and the upper limit temperature was 90° C. (humidification temperature 70° C., current density 1.2 A/cm$^2$), representing a good anti-flooding characteristic and anti-dry-out characteristic as seen in Table 1. No cracks were found in the surface of layer (A).

Example 8

In Example 1 "Formation of layer (A), porous material (J), and layer (B)", dispersion liquid (2) prepared had a carbon black/PTFE resin/surfactant/purified water ratio of 75 parts by mass to 25 parts by mass and a solid content of 23%, and except for this, the same procedure as in Example 1 was carried out to produce a gas diffusion layer. Layer (A) produced from this dispersion liquid (2) had a mean thickness t1 (m) of 30 μm, an areal weight of 20 g/m$^2$, and a void percentage of 52%. Evaluation results of the fuel cell performance of this gas diffusion layer showed a very good anti-plugging characteristic. The output voltage was 0.32 V (operation temperature 65° C., humidification temperature 70° C., current density 2.2 A/cm$^2$) and the upper limit temperature was 90° C. (humidification temperature 70° C., current density 1.2 A/cm$^2$), representing a good anti-flooding characteristic and anti-dry-out characteristic as seen in Table 1. No cracks were found in the surface of layer (A).

Example 9

Except for decreasing the thickness setting for molding, the same procedure as in Example 1 was carried out to produce a porous carbon fiber base substrate with a thickness of 75 m, an areal weight of 24 g/m$^2$, and a bulk density of 0.32 g/cm$^3$, and then hydrophobic treatment was performed as in Example 1 to provide a hydrophobic-treated substrate.

Except that this hydrophobic-treated substrate was used and that the impregnated substrate produced according to "Formation of layer (A), porous material (J), and layer (B)" had a porous material (J) impregnation rate of 11 g/m$^2$ after sintering, the same procedure as in Example 1 was carried out to produce a gas diffusion layer. This gas diffusion layer had a porosity of 23%. Evaluation results of the fuel cell performance of this gas diffusion layer showed a very good anti-plugging characteristic. The output voltage was 0.39 V (operation temperature 65° C., humidification temperature 70° C., current density 2.2 A/cm$^2$) and the upper limit temperature was 90° C. (humidification temperature 70° C., current density 1.2 A/cm$^2$), representing a good anti-flooding characteristic and anti-dry-out characteristic as seen in Table 1. No cracks were found in the surface of layer (A).

Example 10

Except that carbon fiber paper with an areal weight of carbon fiber of 32 g/m$^2$ was obtained in the carbon fiber papermaking process in Example 1 and that impregnation was carried out in the resin impregnation process such that the resin impregnation quantity was 290 parts by mass of phenol resin relative to 100 parts by mass of carbon fiber, the same resin impregnation procedure as in Example 1 was carried out to produce a porous carbon fiber base substrate with a thickness of 200 μm, an areal weight of 80 g/m$^2$, and a bulk density of 0.40 g/cm³, followed by performing hydrophobic treatment as in Example 1 to provide a hydrophobic-treated substrate.

Except that this hydrophobic substrate was used and that the impregnated substrate produced according to "Formation of layer (A), porous material (J), and layer (B)" had a porous material (J) impregnation rate of 28 g/m² after sintering, the same procedure as in Example 1 was carried out to produce a gas diffusion layer. This gas diffusion layer had a porosity of 37%. Evaluation results of the fuel cell performance of this gas diffusion layer showed a good anti-plugging characteristic. The output voltage was 0.32 V (operation temperature 65° C., humidification temperature 70° C., current density 2.2 A/cm²) and the upper limit temperature was 92° C. (humidification temperature 70° C., current density 1.2 A/cm²), representing a good anti-flooding characteristic and anti-dry-out characteristic as seen in Table 1. No cracks were found in the surface of layer (A).

Example 11

A porous layer was formed according to the procedure described in "Formation of porous layer" given below on a hydrophobic-treated substrate prepared in Example 1 to provide a gas diffusion layer.
Formation of Porous Layer The same dispersion liquid (2) as in Example 1 was applied over the above-mentioned hydrophobic-treated substrate using a die coater. In doing this, the discharge rip of the die coater was brought close to the above-mentioned hydrophobic-treated substrate to allow dispersion liquid (2) to infiltrate into the interior of the porous carbon fiber base substrate and the porosity in the CP was controlled close to the value in Example 1. After the coating, heat-drying was carried out at 120° C. to produce a coated substrate.

The heat-dried coated substrate was heated at 380° C. to prepare a gas diffusion layer in which layer (A) and porous material (J) had the same constitution. This means that both layer (A) and porous material (J) were formed from dispersion liquid (2). Layer (A) had a mean thickness t1 (μm) of 19 μm and layer (A) had an areal weight of 20 g/m². We found that porous material (J) was exposed in some parts of the opposite surface, i.e. surface B, of the porous carbon fiber base substrate.

The porosity of the resulting gas diffusion layer was calculated at 31% and the void percentage was calculated at 75% for both porous material (J) and layer (A) in the resulting gas diffusion layer.

Evaluation results of the fuel cell performance of this gas diffusion layer showed a very good anti-plugging characteristic. The output voltage was 0.39 V (operation temperature 65° C., humidification temperature 70° C., current density 2.2 A/cm²) and the upper limit temperature was 90° C. (humidification temperature 70° C., current density 1.2 A/cm²), representing a good anti-flooding characteristic and anti-dry-out characteristic as seen in Table 2. No cracks were found in the surface of layer (A).

Example 12

Except that the above hydrophobic-treated substrate was replaced with the hydrophobic-treated substrate obtained in Example 9 and that the coating weight was adjusted to allow the porosity in the CP to be close to the value in Example 9, the same procedure as in Example 11 was carried out to produce a gas diffusion layer. The replacement of the carbon fiber base substrate resulted in layer (A) with a mean thickness t1 (μm) of 25 μm. Evaluation results of the fuel cell performance of this gas diffusion layer showed a very good anti-plugging characteristic. The output voltage was 0.39 V (operation temperature 65° C., humidification temperature 70° C., current density 2.2 A/cm²) and the upper limit temperature was 90° C. (humidification temperature 70° C., current density 1.2 A/cm²), representing a good anti-flooding characteristic and anti-dry-out characteristic as seen in Table 2. No cracks were found in the surface of layer (A).

Example 13

Except that the hydrophobic-treated substrate obtained in Example 10 was used and that the coating weight was adjusted to allow the areal weight of layer (A) in "Formation of porous layer" to be 29 g/m² and allow the porosity in the CP to be close to the value in Example 10, the same procedure as in Example 11 was carried out to produce a gas diffusion layer. Evaluation results of the fuel cell performance of this gas diffusion layer showed a good anti-plugging characteristic. The output voltage was 0.32 V (operation temperature 65° C., humidification temperature 70° C., current density 2.2 A/cm²) and the upper limit temperature was 92° C. (humidification temperature 70° C., current density 1.2 A/cm²), representing a good anti-flooding characteristic and anti-dry-out characteristic as seen in Table 1. No cracks were found in the surface of layer (A).

The constitutions used in Examples 1 to 13 and evaluation results are summarized in Tables 1 and 2.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Porous carbon filter base substrate | thickness (μm) | 100 | 100 | 100 | 100 | 100 | 100 | 100 | 100 | 75 | 200 |
| | bulk density (g/cm³) | 0.24 | 0.24 | 0.24 | 0.24 | 0.24 | 0.24 | 0.24 | 0.24 | 0.32 | 0.40 |
| Porous layer (A) | mean thickness t1 (μm) | 40 | 15 | 52 | 40 | 40 | 40 | 43 | 30 | 40 | 40 |
| | coating weight (g/m²) | 20 | 8 | 26 | 20 | 20 | 20 | 20 | 20 | 20 | 20 |
| | void percentage in MPL (%) | 75 | 75 | 75 | 75 | 75 | 75 | 80 | 52 | 75 | 75 |
| | number of surface cracks (-) | 0 | 0 | 1 | 0 | 0 | 0 | 0 | 0 | 0 | 0 |
| Porous layer (J) | impregnation weight (g/m²) | 15 | 15 | 15 | 15 | 29 | 8 | 15 | 15 | 11 | 28 |
| | void percentage in MPL (%) | 52 | 52 | 52 | 52 | 52 | 52 | 52 | 52 | 52 | 52 |
| | exposed at opposite surface B | yes | yes | yes | yes | yes | yes | yes | yes | yes | yes |

TABLE 1-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Porous layer (B) | porosity in CP (%) | 31 | 31 | 31 | 31 | 10 | 38 | 31 | 31 | 23 | 37 |
|  | mean thickness of t2 (μm) | 0 | 0 | 0 | 10 | 0 | 0 | 0 | 0 | 0 | 0 |
|  | coating weight (g/m$^2$) | 0 | 0 | 0 | 7 | 0 | 0 | 0 | 0 | 0 | 0 |
|  | void percentage in MPL (%) | — | — | — | 52 | — | — | — | — | — | — |
| Anti-flooding characteristic | output voltage [V] (operation temperature 65° C., humidification temperature 70° C., current density 2.2 A/cm$^2$) | 0.38 | 0.37 | 0.36 | 0.33 | 0.33 | 0.38 | 0.39 | 0.32 | 0.39 | 0.32 |
| Anti-plugging characteristic | voltage drop frequency evaluation (operation temperature 65° C., humidification temperature 70° C., current density 2.2 A/cm$^2$, maintained for 30 min) | S | A | S | S | S | A | S | S | S | A |
| Anti-dry-out characteristic | upper limit temperature [° C.] (humidification temperature 70° C., current density 1.2 A/cm$^2$) | 91 | 90 | 92 | 92 | 92 | 90 | 90 | 92 | 90 | 92 |

TABLE 2

|  |  | Example 11 | Example 12 | Example 13 |
|---|---|---|---|---|
| Porous carbon fiber base substrate | thickness (μm) | 100 | 75 | 200 |
|  | bulk density (g/cm$^3$) | 0.24 | 0.32 | 0.40 |
| dispersion liquid (2) | coating weight (g/m$^2$) | 20 | 20 | 29 |
| Porous layer (A) | mean thickness t1 (μm) | 19 | 25 | 25 |
|  | void percentage in MPL (%) | 75 | 75 | 75 |
|  | number of surface cracks (-) | 0 | 0 | 0 |
| Porous layer (J) (same composition as porous layer (A)) | void percentage in MPL (%) | 75 | 75 | 75 |
|  | exposed at opposite surface B | yes | yes | yes |
|  | porosity in CP (%) | 31 | 23 | 37 |
| Porous layer (B) | mean thickness of t2 (μm) | 0 | 0 | 0 |
|  | coating weight (g/m$^2$) | 0 | 0 | 0 |
|  | void percentage in MPL (%) | — | — | — |
| Anti-flooding characteristic | output voltage [V] (operation temperature 65° C., humidification temperature 70° C., current density 2.2 A/cm$^2$) | 0.39 | 0.39 | 0.32 |
| Anti-plugging characteristic | voltage decrease frequency evaluation (operation temperature 65° C., humidification temperature 70° C., current density 2.2 A/cm$^2$, maintained for 30 min) | S | S | A |
| Anti-dry-out characteristic | upper limit temperature [° C.] (humidification temperature 70° C., current density 1.2 A/cm$^2$) | 90 | 90 | 92 |

Comparative Example 1

Except that impregnation with dispersion liquid (1) was omitted in Example 1 "Formation of layer (A), porous material (J), and layer (B)", the same procedure as in Example 1 was carried out to produce a gas diffusion layer. Evaluation results of the fuel cell performance of this gas diffusion layer showed a largely deteriorated anti-plugging characteristic. The output voltage was 0.38 V (operation temperature 65° C., humidification temperature 70° C., current density 2.2 A/cm$^2$) and the upper limit temperature was 88° C. (humidification temperature 70° C., current density 1.2 A/cm$^2$), representing a good anti-flooding characteristic and a deteriorated anti-dry-out characteristic as seen in Table 3. The poor high-temperature performance is attributed to the fact that the porous carbon fiber base substrate was free of porous material (J), allowing water vapor to escape into the bipolar plate to cause the electrolyte membrane to dry significantly. No cracks were found in the surface of layer (A).

Comparative Example 2

Except for changing the coating weight of dispersion liquid (2) to allow layer (A) to have a mean thickness t1 (m) of 60 μm and allow layer (A) to have an areal weight of 30 g/m$^2$ in Example 1 "Formation of layer (A), porous material (J), and layer (B)", the same procedure as in Example 1 was carried out to produce a gas diffusion layer. Evaluation results of the fuel cell performance of this gas diffusion layer showed a very good anti-plugging characteristic. The output voltage was 0.29 V (operation temperature 65° C., humidification temperature 70° C., current density 2.2 A/cm$^2$) and the upper limit temperature was 86° C. (humidification temperature 70° C., current density 1.2 A/cm$^2$), representing a deteriorated anti-flooding characteristic and anti-dry-out characteristic as seen in Table 3. The poor low-temperature performance is attributed to the fact that the increased thickness of layer (A) acted to prevent water vapor from being discharged from the catalyst layer while the poor high-temperature performance is attributed to the fact that the through-plane gas diffusivity in the gas diffusion layer was low to prevent fuel from being supplied sufficiently to the catalyst. Six cracks were found in the surface of layer (A).

Comparative Example 3

In Example 1 "Formation of layer (A), porous material (J), and layer (B)", dispersion liquid (3) prepared had a carbon black/PTFE resin ratio of 75 parts by mass to 25 parts by mass and a solid content of 24%. In Example 1 "Formation of layer (A), porous material (J), and layer (B)", impregnation with dispersion liquid (1) was omitted, but dispersion liquid (2) was applied over the surface of the porous carbon fiber base substrate as in Example 1 to prepare a coated substrate and then, dispersion liquid (3) was applied over the opposite surface, i.e. surface B, using a die coater, followed by drying and sintering under the same conditions as in Example 1 to provide a gas diffusion layer that had layer (A) and layer (B). Layer (B) had a mean thickness t2 (m) of 30 μm, an areal weight of 15 g/m$^2$, and a void percentage of 66%. Evaluation results of the fuel cell performance of this gas diffusion layer showed a very good anti-plugging characteristic. Output voltage could not be obtained in the anti-flooding characteristic evaluation (operation temperature 65° C., humidification temperature 70° C., current density 2.2 A/cm$^2$) and the upper limit temperature was 90° C. (humidification temperature 70° C., current density 1.2 A/cm$^2$), representing a largely deteriorated anti-flooding characteristic and a good anti-dry-out characteristic as seen in Table 3. The poor low-temperature performance is attributed to the thick layer (B) which acted to decrease the discharge of water into the bipolar plate. No cracks were found in the surface of layer (A).

Comparative Example 4

In Example 1 "Formation of layer (A), porous material (J), and layer (B)", dispersion liquid (1) prepared had a carbon black/PTFE resin ratio of 75 parts by mass to 25 parts by mass and a solid content of 23%. This dispersion liquid (1) was found to have a viscosity of 50 mPa·s when examined with a B type viscometer. This dispersion liquid (1) was put in a stainless steel tray and the hydrophobic-treated substrate completely dipped in this dispersion liquid (1). Then, except that the liquid attached to the surface was not scraped off with a stainless steel spatula before heat-drying at 120° C. for 10 minutes, that layer (B) with a mean thickness t2 (m) of 11 μm was formed over the entirety of the opposite surface, i.e. surface (B), of the porous carbon fiber base substrate, and that an impregnated substrate having an impregnation rate of 43 g/m$^2$ (porous material (J) 35 g/m$^2$+layer (B) 8 g/m$^2$) after sintering was obtained, the same procedure as in Example 1 was carried out to produce a gas diffusion layer. Evaluation results of the fuel cell performance of this gas diffusion layer showed a very good anti-plugging characteristic. This gas diffusion layer had a porosity of 2%. The output voltage was 0.25 V (operation temperature 65° C., humidification temperature 70° C., current density 2.2 A/cm$^2$) and the upper limit temperature was 89° C. (humidification temperature 70° C., current density 1.2 A/cm$^2$), representing a deteriorated anti-flooding characteristic and anti-dry-out characteristic as seen in Table 3. The poor low-temperature performance is attributed to the fact that the porous carbon fiber base substrate was filled with dense porous materials (J) that acted to prevent water vapor from being discharged from the catalyst layer while the poor high-temperature performance is attributed to the fact that the dense porous materials (J) acted to maintain a low through-plane gas diffusivity in the gas diffusion layer, preventing fuel from being supplied sufficiently to the catalyst. One crack was found in the surface of layer (A).

Comparative Example 5

In Example 1 "Formation of layer (A), porous material (J), and layer (B)", dispersion liquid (2) prepared had a carbon black/PTFE resin ratio of 75 parts by mass to 25 parts by mass and a solid content of 23%, and except for this, the same procedure as in Example 1 was carried out to produce a gas diffusion layer. Layer (A) produced from this dispersion liquid (2) had a mean thickness t1 (m) of 25 μm, an areal weight of 20 g/m$^2$, and a void percentage of 45%. Evaluation results of the fuel cell performance of this gas diffusion layer showed a good anti-plugging characteristic. Output voltage could not be obtained in the anti-flooding characteristic evaluation (operation temperature 65° C., humidification temperature 70° C., current density 2.2 A/cm$^2$) and the upper limit temperature was 88° C. (humidification temperature 70° C., current density 1.2 A/cm$^2$), representing a deteriorated anti-flooding characteristic and a deteriorated anti-dry-out characteristic as seen in Table 3. The poor low-temperature performance is attributed to the fact that layer (A) is low in void percentage to prevent water vapor from being discharged from the catalyst layer while the poor high-temperature performance is attributed to the fact that layer (A) low in void percentage acted to decrease the through-plane gas diffusivity in the gas diffusion layer, preventing fuel from being supplied sufficiently to the catalyst. No cracks were found in the surface of layer (A).

Comparative Example 6

Except that carbon fiber paper of 28 g/m$^2$ was obtained in the carbon fiber papermaking process in Example 1 and that impregnation was subsequently carried out in the resin impregnation process such that the resin impregnation quantity was 403 parts by mass of phenol resin relative to 100 parts by mass of carbon fiber to produce resin-impregnated carbon fiber paper, followed by compressing a stack of two sheets of the resin-impregnated carbon fiber paper in a pressing process, the same resin impregnation procedure as in Example 1 was carried out to produce a porous carbon fiber base substrate with a thickness of 350 μm, an areal weight of 175 g/m$^2$, and a bulk density of 0.50 g/cm$^3$. Then, hydrophobic treatment was performed as in Example 1 to provide a hydrophobic-treated substrate.

Except that by using this hydrophobic-treated substrate, the impregnated substrate produced in Example 1 "Formation of layer (A), porous material (J), and layer (B)" had a porous material (J) impregnation rate of 38 g/m² after sintering, the same procedure as in Example 1 was carried out to produce a gas diffusion layer. This gas diffusion layer had a porosity of 30%. Evaluation results of the fuel cell performance of this gas diffusion layer showed a good anti-plugging characteristic. Output voltage could not be obtained in the anti-flooding characteristic evaluation (operation temperature 65° C., humidification temperature 70° C., current density 2.2 A/cm²) and the upper limit temperature was 90° C. (humidification temperature 70° C., current density 1.2 A/cm²), representing a largely deteriorated anti-flooding characteristic and a good anti-dry-out characteristic as seen in Table 3. The poor low-temperature performance is attributed to the fact that the porous carbon fiber base substrate had a large thickness and a large bulk density, which acted to decrease the discharge of water into the bipolar plate. No cracks were found in the surface of layer (A).

The constitutions used in Comparative examples 1 to 6 and evaluation results are summarized in Table 3.

TABLE 3

|  |  | Comparative example 1 | Comparative example 2 | Comparative example 3 | Comparative example 4 | Comparative example 5 | Comparative example 6 |
|---|---|---|---|---|---|---|---|
| Porous carbon filter base substrate | thickness (μm) | 100 | 100 | 100 | 100 | 100 | 350 |
|  | bulk density (g/cm³) | 0.24 | 0.24 | 0.24 | 0.24 | 0.24 | 0.50 |
| Porous layer (A) | mean thickness t1 (μm) | 35 | 60 | 40 | 40 | 25 | 40 |
|  | coating weight (g/m²) | 20 | 30 | 20 | 20 | 20 | 20 |
|  | void percentage in MPL (%) | 75 | 75 | 75 | 75 | 45 | 75 |
|  | number of surface cracks (-) | 0 | 6 | 0 | 1 | 0 | 0 |
| Porous layer (J) | impregnation weight (g/m²) | 0 | 15 | 0 | 35 | 15 | 38 |
|  | void percentage in MPL (%) | — | 52 | — | 52 | 52 | 52 |
|  | exposed at opposite surface B | no | yes | no | yes | yes | yes |
|  | porosity in CP (%) | 46 | 31 | 39 | 2 | 31 | 30 |
| Porous layer (B) | mean thickness of t2 (μm) | — | 0 | 30 | 11 | 0 | 0 |
|  | coating weight (g/m²) | — | 0 | 15 | 8 | 0 | 0 |
|  | void percentage in MPL (%) | — | — | 66 | 52 | — | — |
| Anti-flooding characteristic | output voltage [V] (operation temperature 65° C., humidification temperature 70° C., current density 2.2 A/cm²) | 0.38 | 0.29 | — | 0.25 | — | — |
| Anti-plugging characteristic | voltage decrease frequency evaluation (operation temperature 65° C., humidification temperature 70° C., current density 2.2 A/cm², maintained for 30 min) | C | S | S | S | A | A |
| Anti-dry-out characteristic | upper limit temperature [° C.] (humidification temperature 70° C., current density 1.2 A/cm²) | 88 | 86 | 90 | 89 | 88 | 90 |

The invention claimed is:

1. A fuel cell gas diffusion layer comprising:
   a porous carbon fiber base substrate
   1) consisting of discontinuous carbon fibers bonded to each other with carbonized material,
   2) being impregnated with porous material (J) at least part of which is exposed at one surface B thereof,
   3) having internal pores with a cross-sectional area accounting for 5% to 40% of the total cross section in a through-plane direction with carbonaceous particles in the porous carbon fiber base substrate, and
   4) having a thickness of 60 to 300 μm and a density of 0.20 to 0.45 g/cm³, and
   a layer (A) containing voids, the layer (A) having a mean thickness t1 of 10 to 55 μm and consisting of 1) carbonaceous particles, and 2) a hydrophobic polymer deposited on an opposite surface A of the porous carbon fiber base substrate,
   at least layer (A) and porous material (J) both having a void percentage of 50% to 85%.

2. The fuel cell gas diffusion layer as described in claim 1, wherein layer (A) and porous material (J) have different constitutions.

3. The fuel cell gas diffusion layer as described in claim 1, wherein layer (A) and porous material (J) have the same constitution.

4. The fuel cell gas diffusion layer as described in claim 1, further comprising layer (B) with a mean thickness t2 of 0 to 20 μm deposited on the opposite surface B.

5. The fuel cell gas diffusion layer as described in claim 1, wherein layer (B) and porous material (J) utilize the same dispersion liquid.

6. The fuel cell gas diffusion layer as described in claim 1, wherein the porous carbon fiber base substrate and the porous layers further contain a hydrophobic polymer.

7. The fuel cell gas diffusion layer as described in claim 6, wherein the hydrophobic polymer is distributed unevenly in the porous carbon fiber base substrate, with a larger concentration near the layer (A).

8. The fuel cell gas diffusion layer as described in claim 1, wherein the carbonaceous particles contained in the porous layer account for 5 to 95 mass %.

9. The fuel cell gas diffusion layer as described in claim 1, wherein the carbonaceous particles contain at least carbon black.

10. The fuel cell gas diffusion layer as described in claim 1, wherein the void percentage of layer (A) is higher than the void percentage of layer (B) or that of porous material (J).

11. The fuel cell gas diffusion layer as described in claim 1, wherein crack frequency in the layer (A) is smaller than crack frequency in the porous material (J).

12. The fuel cell gas diffusion layer as described in claim 1, wherein crack frequency in the layer (A) is one per square millimeter or less.

13. A fuel cell gas diffusion layer comprising:
a porous carbon fiber base substrate
1) consisting of discontinuous carbon fibers bonded to each other with carbonized material,
2) being impregnated with porous material (J) at least part of which is exposed at one surface B thereof,
3) having internal pores with a cross-sectional area accounting for 5% to 40% of the total cross section in a through-plane direction with carbonaceous particles in the porous carbon fiber base substrate,
4) having a thickness of 60 to 300 μm and a density of 0.20 to 0.45 g/cm³, and
a layer (A) containing voids, the layer (A) having a mean thickness t1 of 10 to 55 μm and consisting of 1) carbonaceous particles, and 2) a hydrophobic polymer deposited on an opposite surface A of the porous carbon fiber base substrate,
at least layer (A) and porous material (J) both having a void percentage of 50% to 85%, and porous material (J) is a part of the layer (A).

* * * * *